United States Patent
Ju et al.

(10) Patent No.: US 9,609,217 B2
(45) Date of Patent: Mar. 28, 2017

(54) IMAGE-BASED MOTION SENSOR AND RELATED MULTI-PURPOSE CAMERA SYSTEM

(75) Inventors: Chi-Cheng Ju, Hsinchu (TW); Cheng-Tsai Ho, Taichung (TW); Ding-Yun Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 142 days.

(21) Appl. No.: 13/610,890

(22) Filed: Sep. 12, 2012

(65) Prior Publication Data

US 2013/0147974 A1 Jun. 13, 2013

Related U.S. Application Data

(60) Provisional application No. 61/554,612, filed on Nov. 2, 2011, provisional application No. 61/580,932, filed on Dec. 28, 2011.

(51) Int. Cl.
*H04N 5/232* (2006.01)
*H04N 5/225* (2006.01)

(52) U.S. Cl.
CPC ......... *H04N 5/23248* (2013.01); *H04N 5/225* (2013.01); *H04N 5/23245* (2013.01); *H04N 5/23254* (2013.01)

(58) Field of Classification Search
CPC .................................... H04N 5/23245
USPC ........................................ 348/208.1
See application file for complete search history.

(56) References Cited

U.S. PATENT DOCUMENTS

| | | | |
|---|---|---|---|
| 2004/0100574 A1* | 5/2004 | Voss et al. | 348/362 |
| 2004/0130628 A1* | 7/2004 | Stavely | 348/208.4 |
| 2006/0177103 A1* | 8/2006 | Hildreth | G06F 1/1686 382/107 |
| 2006/0215043 A1* | 9/2006 | Furukawa | 348/222.1 |
| 2007/0230938 A1* | 10/2007 | Hatanaka | G03B 17/00 396/153 |
| 2007/0285527 A1* | 12/2007 | Kusayama | H04N 5/23248 348/222.1 |
| 2008/0204564 A1* | 8/2008 | Yumiki | 348/208.99 |
| 2009/0181719 A1* | 7/2009 | Cho | 455/556.1 |
| 2010/0020191 A1* | 1/2010 | Sugimoto | 348/222.1 |
| 2011/0074974 A1* | 3/2011 | Hildreth | 348/222.1 |
| 2011/0176014 A1* | 7/2011 | Hong et al. | 348/208.4 |

(Continued)

FOREIGN PATENT DOCUMENTS

| CN | 101072300 A | 11/2007 |
|---|---|---|
| CN | 101212575 A | 7/2008 |

*Primary Examiner* — Lin Ye
*Assistant Examiner* — Chan Nguyen
(74) *Attorney, Agent, or Firm* — Winston Hsu; Scott Margo

(57) ABSTRACT

An image-based motion sensor includes a camera system and a processing system. The camera system is arranged for generating an image output including a plurality of captured images. The processing system is arranged for obtaining a motion sensor output by processing the image output, wherein the motion sensor output includes information indicative of at least one of a motion status and an orientation status of the image-based motion sensor. For example, information indicative of the orientation status of the image-based motion sensor may includes roll, pitch, and yaw related motion information, and information indicative of the motion status of the image-based motion sensor may includes speed, acceleration and displacement information.

29 Claims, 20 Drawing Sheets

(56) References Cited

U.S. PATENT DOCUMENTS

2011/0185122 A1* 7/2011 Choi .............................. 711/114
2013/0343611 A1* 12/2013 Subramanian .......... G06F 3/011
　　　　　　　　　　　　　　　　　　　　　　382/103
2015/0234481 A1* 8/2015 Nasiri ................... G06F 3/0346
　　　　　　　　　　　　　　　　　　　　　　702/141

* cited by examiner

IMAGE-BASED MOTION SENSOR AND RELATED MULTI-PURPOSE CAMERA SYSTEM

CROSS REFERENCE TO RELATED APPLICATIONS

This application claims the benefit of U.S. provisional application No. 61/554,612 (filed on Nov. 2, 2011) and U.S. provisional application No. 61/580,932 (filed on Dec. 28, 2011), which are incorporated herein by reference.

BACKGROUND

The disclosed embodiments of the present invention relate to a camera system, and more particularly, to an image-based motion sensor and related multi-purpose camera system which supports normal camera functionality and additional motion sensor functionality.

The mobile phones are generally equipped with some sensors for different applications. For example, a general smart phone may have a G-sensor (accelerometer) and a Gyro sensor. The G-sensor is capable of providing speed, displacement and acceleration information in the moving direction(s). Regarding the Gyro sensor, it is capable of measuring the orientation directly, and may be implemented using mechanical means or MEM (MicroElectroMechanical) means. However, regarding certain low-cost application devices such as feature phones, using the G-sensor and the Gyro sensor is not practical due to their high cost.

Thus, there is a need for an innovative design which can support motion sensor related operations (e.g., acceleration, speed, displacement, roll, pitch, and yaw) without actually using the physical motion sensors (e.g., G-sensor and Gyro sensor).

SUMMARY

In accordance with exemplary embodiments of the present invention, an image-based motion sensor and related multi-purpose camera system which supports normal camera functionality and additional motion sensor functionality are proposed to solve the above-mentioned problem.

According to a first aspect of the present invention, an exemplary image-based motion sensor is disclosed. The exemplary image-based motion sensor includes a camera system and a processing system. The camera system is arranged for generating an image output including a plurality of captured images. The processing system is arranged for obtaining a motion sensor output by processing the image output, wherein the motion sensor output includes information indicative of at least one of a motion status and an orientation status of the image-based motion sensor.

According to a second aspect of the present invention, an exemplary multi-purpose camera system is disclosed. The exemplary multi-purpose camera system includes an image capture block and an image signal processing block. The image capture block is arranged for generating an image signal. The image signal processing block is arranged for processing the image signal. When the multi-purpose camera system is operated in a first operation mode, the multi-purpose camera system acts as a camera for generating a captured image output; and when the multi-purpose camera system is operated in a second operation mode, the multi-purpose camera system acts as part of a motion sensor for generating a motion sensor output.

According to a third aspect of the present invention, an exemplary electronic device is disclosed. The exemplary electronic device includes a multi-purpose camera system and a processing system. The multi-purpose camera system includes an image capture block and an image signal processing block. The image capture block is arranged for generating an image signal. The image signal processing block is arranged for processing the image signal. When the multi-purpose camera system is operated in a first operation mode, the multi-purpose camera system acts as a camera for generating a captured image output, and when the multi-purpose camera system is operated in a second operation mode, the multi-purpose camera system acts as part of a motion sensor. The processing system acts as another part of the motion sensor, and is arranged for generating a motion sensor output by processing the image output, wherein the motion sensor output includes information indicative of at least one of a motion status and an orientation status of the electronic device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is coupled to another device, that connection may be through a direct electrical connection, or through an indirect electrical connection via other devices and connections.

The main concept of the present invention is to use a camera system to simulate the motion sensor operations. In other words, the present invention proposes an image-based motion sensor, where the camera system is part of the image-based motion sensor. In this way, a solution with low cost and high system reliability is provided. In one exemplary implementation, the camera system may be a dedicated component for the image-based motion sensor. In another exemplary implementation, the camera system may be a multi-purpose camera system that supports multiple operation modes. For example, when the multi-purpose camera system is operated in a first operation mode, the multi-purpose camera system acts as a normal camera, and when the multi-purpose camera system is operated in a second operation mode, the multi-purpose camera system acts as part of the image-based motion sensor. Further details are described as below.

Figure 1:
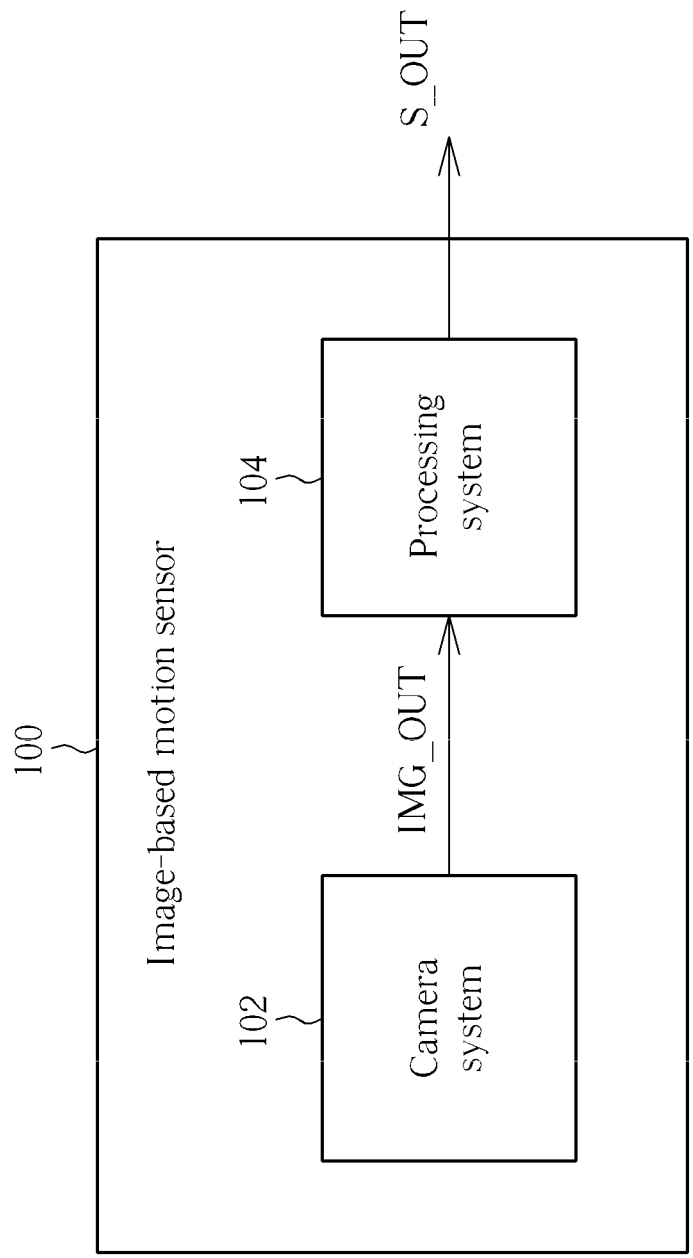
FIG. 1 is a diagram illustrating an image-based motion sensor according to an exemplary embodiment of the present invention.

FIG. 1 is a diagram illustrating an image-based motion sensor according to an exemplary embodiment of the present invention. The image-based motion sensor 100 includes, but is not limited to, a camera system 102 and a processing system 104. The camera system 102 is arranged for generating an image output IMG_OUT including a plurality of captured images/frames. The processing system 104 is arranged for obtaining a motion sensor output S_OUT by processing the image output IMG_OUT, wherein the motion sensor output S_OUT includes information indicative of at least one of a motion status and an orientation status of the image-based motion sensor 100. For example, when the motion sensor output S_OUT includes information indicative of the orientation status, the motion sensor output S_OUT may include roll, pitch, and yaw related motion information. When the motion sensor output S_OUT includes information indicative of the motion status, the motion sensor output S_OUT may include speed, acceleration and displacement information. To put it simply, the image-based motion sensor 100 may simulate the G-sensor operation and/or the Gyro sensor operation by means of the image processing applied to the captured images.

In one exemplary design, the processing system 104 may be configured to support global motion estimation used for determining the motion sensor output S_OUT. Please refer to FIG. 2, which is a diagram illustrating an exemplary implementation of the processing system 104 shown in FIG. 1. The processing system 104 includes a global motion estimation block 202 and a processor 204. The global motion estimation block 202 is arranged for generating global motion information INF according to the image output IMG_OUT of the camera system 102. The processor 204 is arranged for determining the motion sensor output S_OUT according to the global motion information INF. The global motion estimation block 202 may be a functional block dedicated to processing the image output IMG_OUT. However, this is for illustrative purposes only, and is not meant to be a limitation of the present invention. Alternatively, if the camera system 102 is equipped with an electronic image stabilization (EIS) module, the global motion estimation block 202 may include the EIS module due to the fact that the EIS module is capable of performing the desired global motion estimation. Specifically, the EIS module performs its designated EIS function when the camera system 102 is operated in a normal camera mode, and acts as the global motion estimation block 202 when the camera system 102 is operated in a motion sensor mode.

In a case where the image-based motion sensor 100 acts as a Gyro sensor, the processor 204 would generate the motion sensor output S_OUT including roll, pitch, and yaw related information. When the image-based motion sensor 100 is rotated by Y-axis, the same object in consecutive captured images would have horizontal movement due to camera yaw. When the image-based motion sensor 100 is rotated by X-axis, the same object in consecutive captured images would have vertical movement due to camera pitch. When the image-based motion sensor 100 is rotated by Z-axis, the same object in consecutive captured images would have circular movement due to camera roll. Hence, based on such an observation, the yaw related information, the pitch related information and the roll related information can be estimated by global motion estimation result derived from processing consecutive captured images. Please refer to FIG. 3, which is a diagram illustrating a first exemplary implementation of the global motion estimation block 202 shown in FIG. 2. The global motion estimation block 202 may be realized by the global motion estimation block 300, where the global motion estimation block 300 includes a motion estimation unit 302 and a motion vector analysis unit 304. The motion estimation unit 302 is arranged for performing motion estimation upon each pair of co-located sub-images (e.g., A1, A2, A3, and A4) in a first captured image F_1 and a second captured image F_2, and accordingly generating a motion vector (e.g., MV1, MV2, MV3 and MV4) of the pair of co-located sub-images, wherein the first captured image F_1 and the second captured image F_2 are consecutive captured images. By way of example, each sub-image may be a sub-block with a size of 16×16, the first captured image F_1 is the previous image, and the second captured image F_2 is the current image which is captured immediately after the previous image is captured. It should be noted that the number of co-located sub-image pairs as shown in FIG. 3 is for illustrative purposes only. In practice, each of the captured images is allowed to be divided into any number of sub-images, depending upon the actual design of the motion estimation unit 302.

The motion vector analysis unit 304 is arranged for generating the global motion information INF by analyzing the motion vectors (e.g., MV1-MV4). Specifically, based on the global motion direction indicated by the motion vectors MV1-MV4, the camera rotation/orientation status can be determined. Accordingly, the rotation/orientation status of the image-based motion sensor 100 is obtained.

Figure 4:
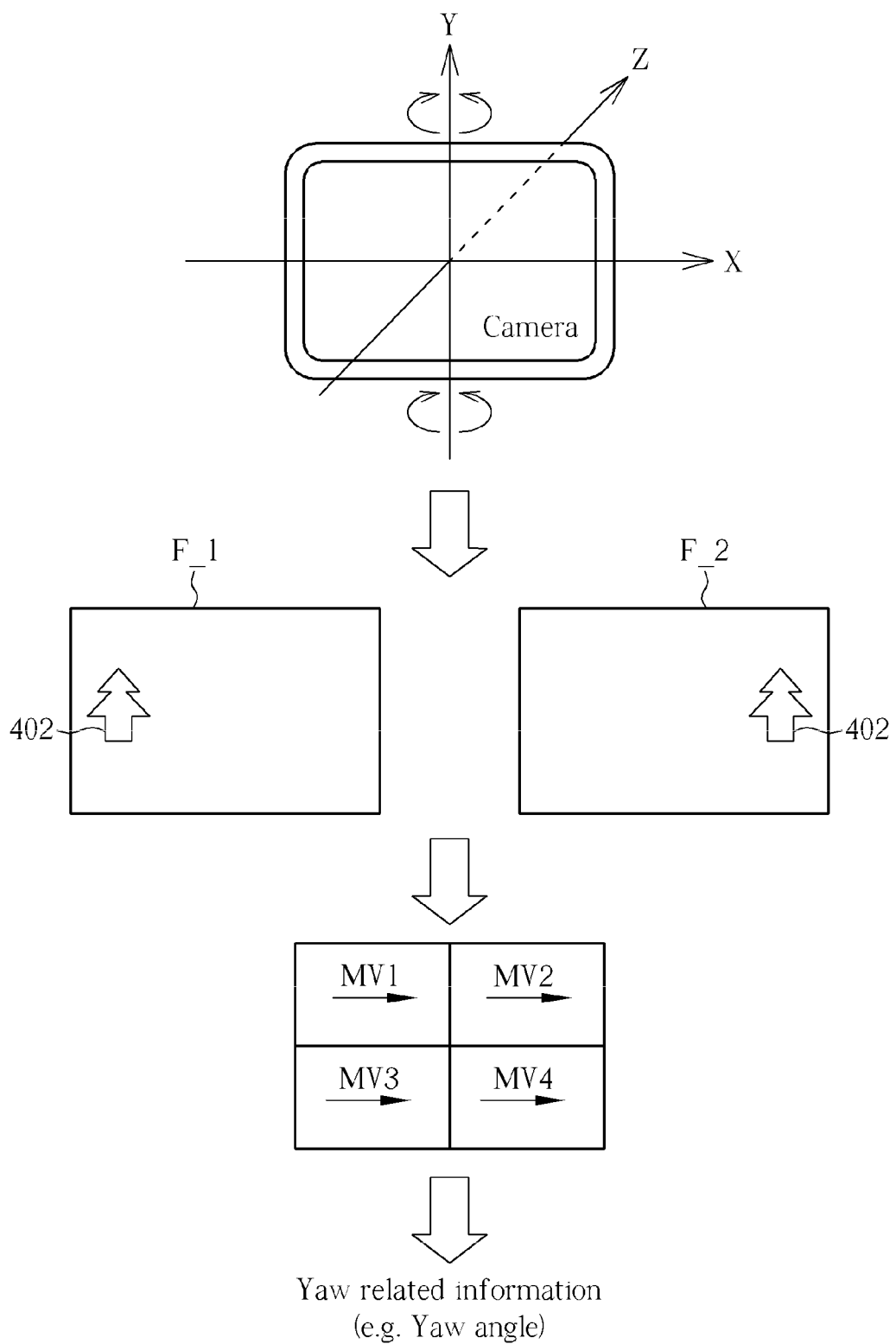
FIG. 4 is a diagram illustrating how the processing system determines the yaw related information when the global motion estimation block is employed in the image-based motion sensor.

FIG. 4 is a diagram illustrating how the processing system 104 determines the yaw related information when the global motion estimation block 300 is employed in the image-based motion sensor 100. If the image-based motion sensor 100 is rotated by Y-axis, the camera lens would also be rotated by Y-axis. As shown in FIG. 4, the location of the object 402 in the first captured image F_1 is shifted horizontally to the new location in the second captured image F_2 due to camera rotation. After the motion estimation unit 302 performs motion estimation upon the pairs of sub-images A1-A4, respectively, the obtained motion vectors MV1-MV4 are all in the X-axis. The motion vector analysis unit 304 finds that all of the motion vectors MV1-MV4 are in the X-axis, and therefore determines that the camera rotation is camera yaw. Besides, the motion vector analysis unit 304 may also determine the yaw related information (e.g., yaw angle) according to the motion vectors MV1-MV4. For example, the motion vector analysis unit 304 may use one of the motion vectors MV1-MV4 or an average of the motion vectors MV1-MV4 to determine the value of the yaw angle. It should be noted that, based on the rotation direction of the camera yaw, the motion vectors MV1-MV4 may be either leftward motion vectors or rightward motion vectors.

Figure 5:
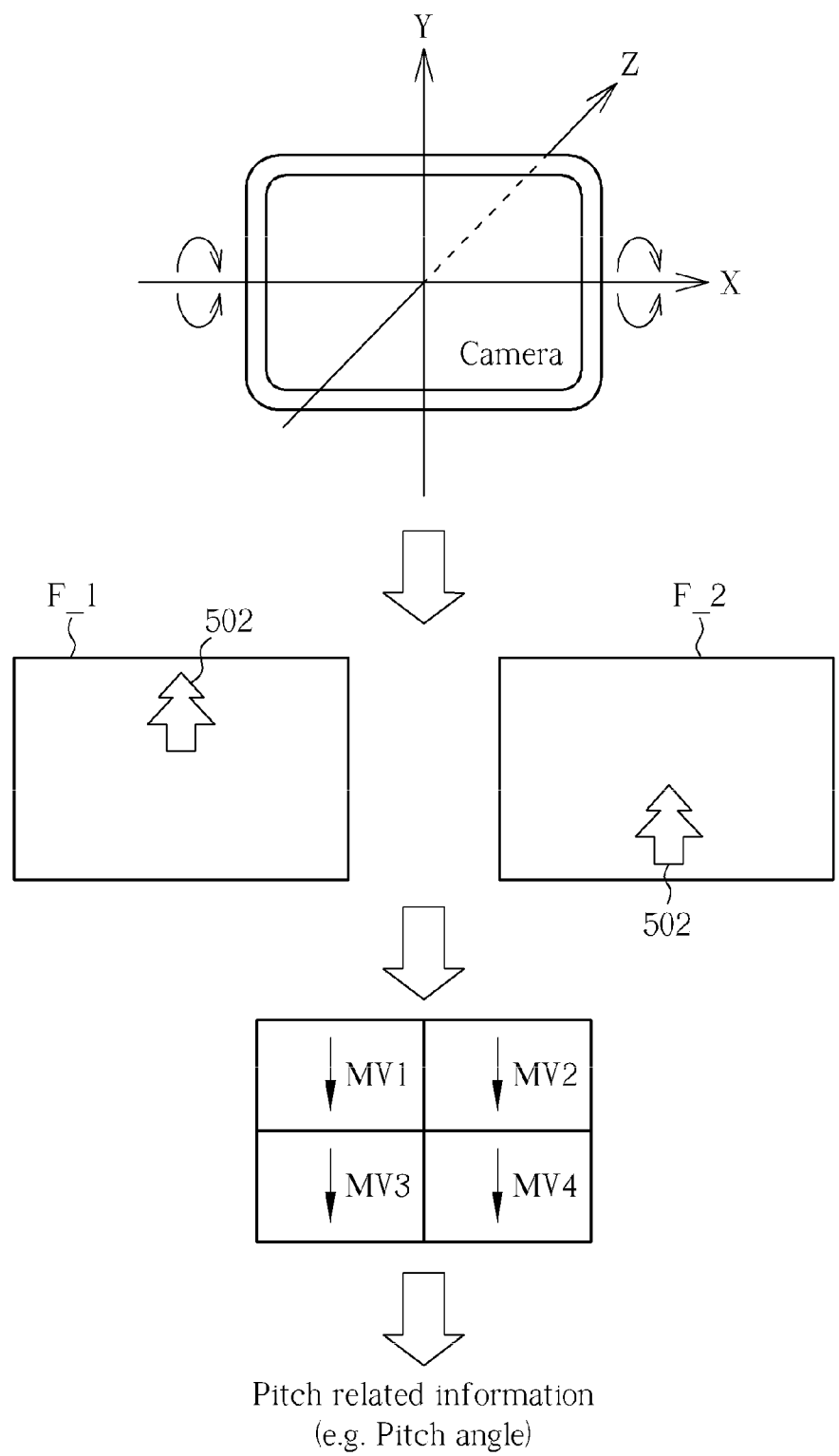
FIG. 5 is a diagram illustrating how the processing system determines the pitch related information when the global motion estimation block is employed in the image-based motion sensor.

FIG. 5 is a diagram illustrating how the processing system 104 determines the pitch related information when the global motion estimation block 300 is employed in the image-based motion sensor 100. If the image-based motion sensor 100 is rotated by X-axis, the camera lens would also be rotated by X-axis. As shown in FIG. 5, the location of the object 502 in the first captured image F_1 is shifted vertically to the new location in the second captured image F_2 due to camera rotation. After the motion estimation unit 302 performs motion estimation upon the pairs of sub-images A1-A4, respectively, the obtained motion vectors MV1-MV4 are all in the Y-axis. The motion vector analysis unit 304 finds that all of the motion vectors MV1-MV4 are in the Y-axis, and therefore determines that the camera rotation is camera pitch. Besides, the motion vector analysis unit 304 may also determine the pitch related information (e.g., pitch angle) according to the motion vectors MV1-MV4. For example, the motion vector analysis unit 304 may use one of the motion vectors MV1-MV4 or an average of the motion vectors MV1-MV4 to determine the value of the pitch angle. It should be noted that, based on the rotation direction of the camera pitch, the motion vectors MV1-MV4 may be either upward motion vectors or downward motion vectors.

Figure 6:
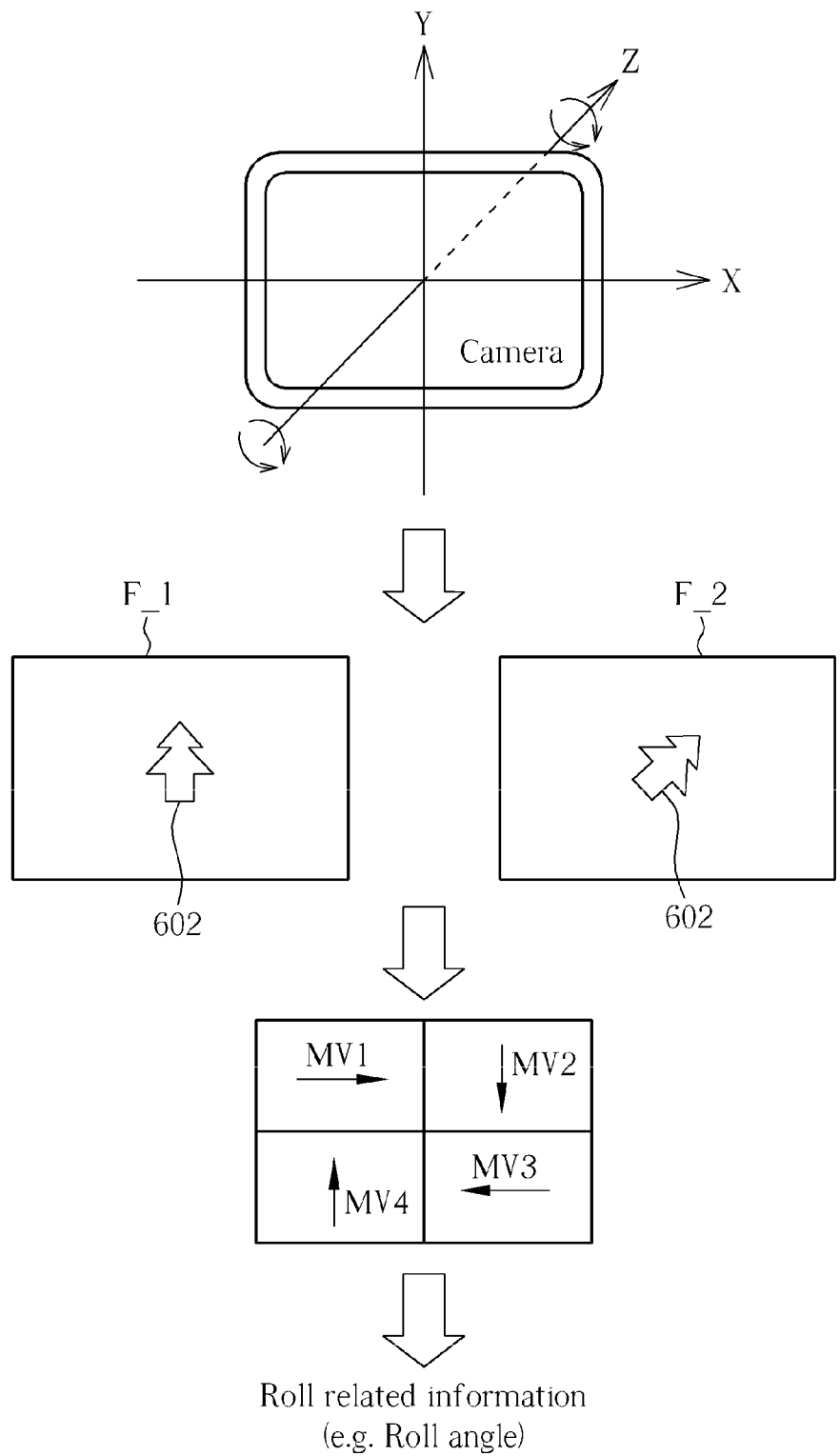
FIG. 6 is a diagram illustrating how the processing system determines the roll related information when the global motion estimation block is employed in the image-based motion sensor.

FIG. 6 is a diagram illustrating how the processing system 104 determines the roll related information when the global motion estimation block 300 is employed in the image-based motion sensor 100. If the image-based motion sensor 100 is rotated by Z-axis, the camera lens would also be rotated by Z-axis. As shown in FIG. 6, the object 602 in the first captured image F_1 is rotated in the second captured image F_2 due to camera rotation. After the motion estimation unit 302 performs motion estimation upon the pairs of sub-images A1-A4, respectively, the obtained motion vectors MV1-MV4 are in a circle. The motion vector analysis unit 304 finds that the motion vectors MV1-MV4 are in a circle, and therefore determines that the camera rotation is camera roll. Besides, the motion vector analysis unit 304 may also determine the roll related information (e.g., roll angle) according to the motion vectors MV1-MV4. For example, the motion vector analysis unit 304 may use one of the motion vectors MV1-MV4 or an average of the motion vectors MV1-MV4 to determine the value of the roll angle. It should be noted that, based on the rotation direction of the camera roll, the motion vectors MV1-MV4 may be either clockwise motion vectors or counterclockwise motion vectors.

In above examples, the motion estimation unit 302 (e.g., an EIS module) is required to perform N motion estimation operations when each captured image is divided into N sub-images. Hence, the computation complexity may be high if the value of N is large. To reduce the computation complexity and/or improve the detection accuracy, alternative embodiments of the global motion estimation block 202 shown in FIG. 2 are provided as below.

Figure 2:
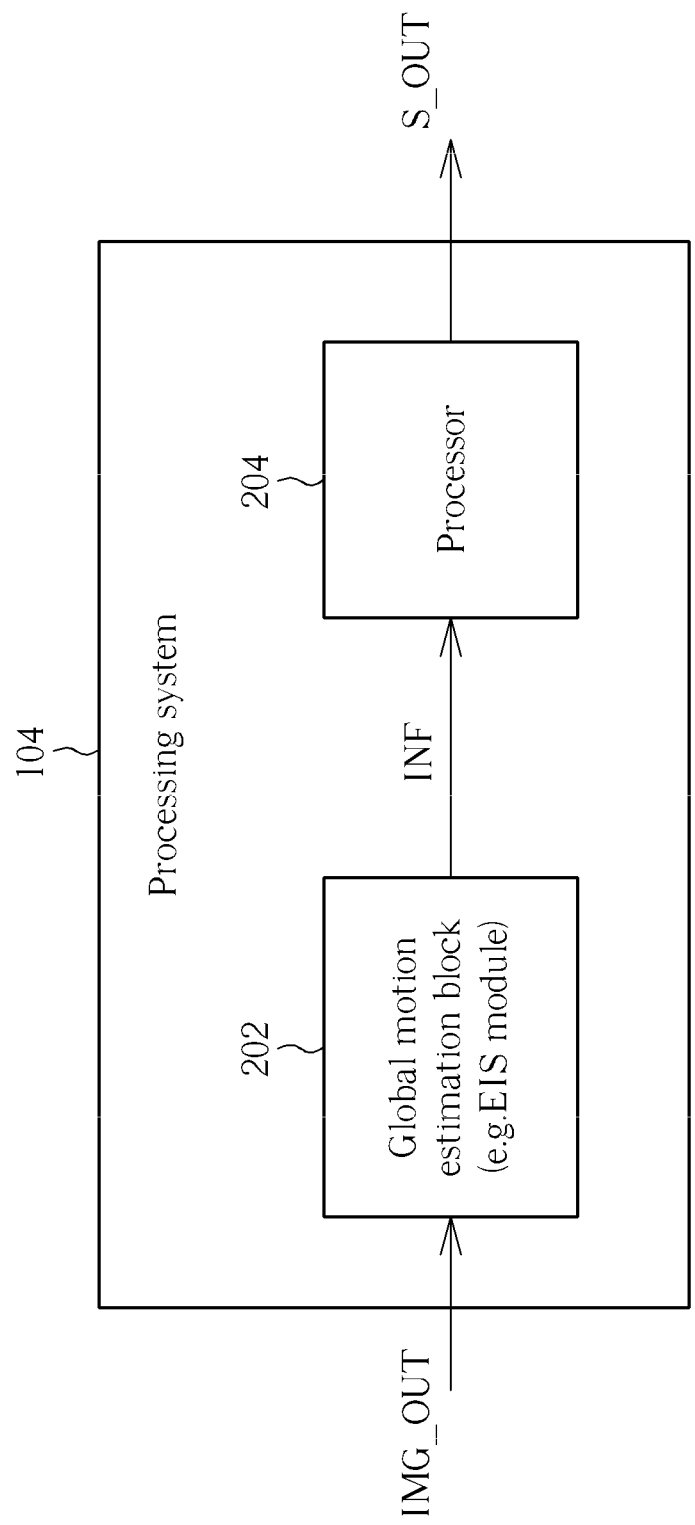
FIG. 2 is a diagram illustrating an exemplary implementation of the processing system shown in FIG. 1.
Figure 3:
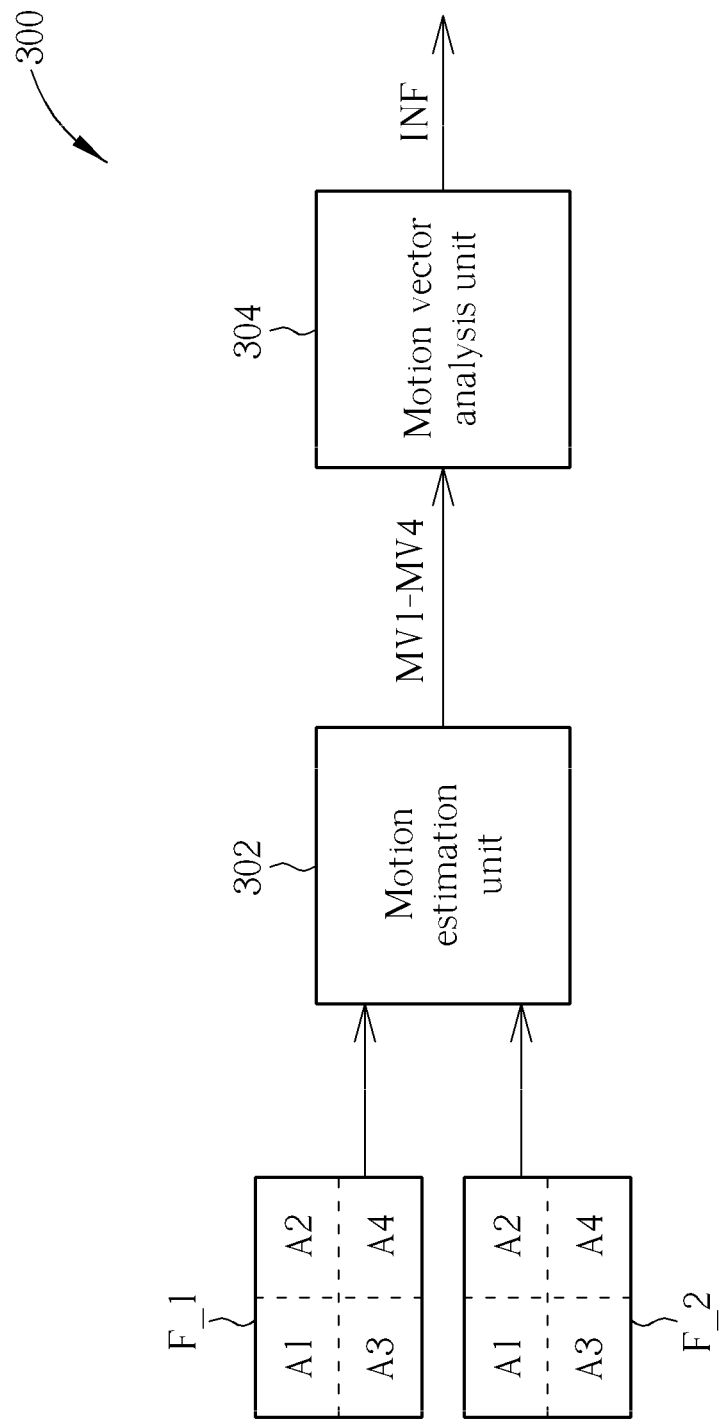
FIG. 3 is a diagram illustrating a first exemplary implementation of the global motion estimation block shown in FIG. 2.
Figure 7:
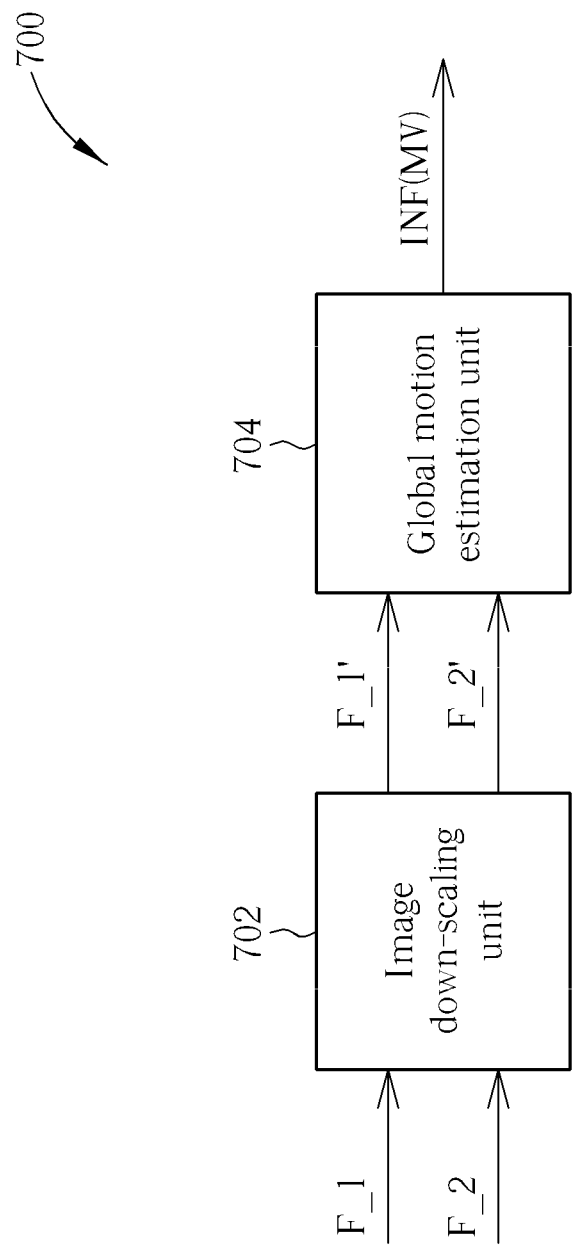
FIG. 7 is a diagram illustrating a second exemplary implementation of the global motion estimation block shown in FIG. 2.

Please refer to FIG. 7, which is a diagram illustrating a second exemplary implementation of the global motion estimation block 202 shown in FIG. 2. The global motion estimation block 202 may be realized using the global motion estimation block 700, where the global motion estimation block 700 includes an image down-scaling unit 702 and a global motion estimation unit 704. The image down-scaling unit 702 is arranged for down-scaling a first captured image F_1 and a second captured image F_2 to generate a first down-scaled image F_1' and a second down-scaled image F_2', respectively. The first captured image F_1 and the second captured image F_2 are consecutive captured images. For example, the first captured image F_1 is a previous image, and the second captured image F_2 is a current image which is captured immediately after the previous image is captured. Assuming that each of the first captured image F_1 and the second captured image F_2 has the size of 640×480, the image down-scaling unit 702 may be configured to resize the first captured image F_1 and the second captured image F_2 to make each of the first down-scaled image F_1' and the second down-scaled image F_2' has the size of 80×80.

The global motion estimation unit 704 is arranged for generating the global motion information INF by performing global motion estimation upon the first down-scaled image F_1' and the second down-scaled image F_2'. In general, motion estimation is the process of determining motion vectors each matching an image block in one image to an image block in another image. Regarding the global motion estimation, it is used to determine a single motion vector for two images. If each of the first down-scaled image F_1' and the second down-scaled image F_2' has the size of 80×80, the global motion estimation unit 704 may crop a central image block with a size of 60×60 from the first down-scaled image F_1', and employ a search range from −10 to +10 to find a matched image block with the same size of 60×60 in the second down-scaled image F_2' for determining a global motion vector MV as the global motion information INF. The global motion vector MV may be decomposed into an X-axis motion vector component MVx and a Y-axis motion vector component MVy. The processor 204 refers to the motion vector component MVx to determine the yaw related information (e.g., yaw angle), and refers to the motion vector component MVy to determine the pitch related information (e.g., pitch angle). As the image down-scaling unit 702 is capable of reducing the image size of the images to be processed by the following global motion estimation unit 704, the computation complexity is effectively reduced.

The configuration shown in FIG. 7 is an alternative design used for obtaining the yaw angle and the pitch angle only. Regarding the determination of the roll angle, a different configuration should be employed. Please refer to FIG. 8, which is a diagram illustrating a third exemplary implementation of the global motion estimation block 202 shown in FIG. 2. The global motion estimation block 202 may be realized using the global motion estimation block 800, where the global motion estimation block 800 includes an image down-scaling unit 802, a transform unit 804, and a global motion estimation unit 806. The image down-scaling unit 802 is arranged for generating a first down-scaled image F_1' of a first captured image F_1 and generating a second down-scaled image F_2' of a second captured image F_2. The first captured image F_1 and the second captured image F_2 are consecutive captured images. For example, the first captured image F_1 is a previous image, and the second captured image F_2 is a current image which is captured immediately after the previous image is captured.

Figure 9:
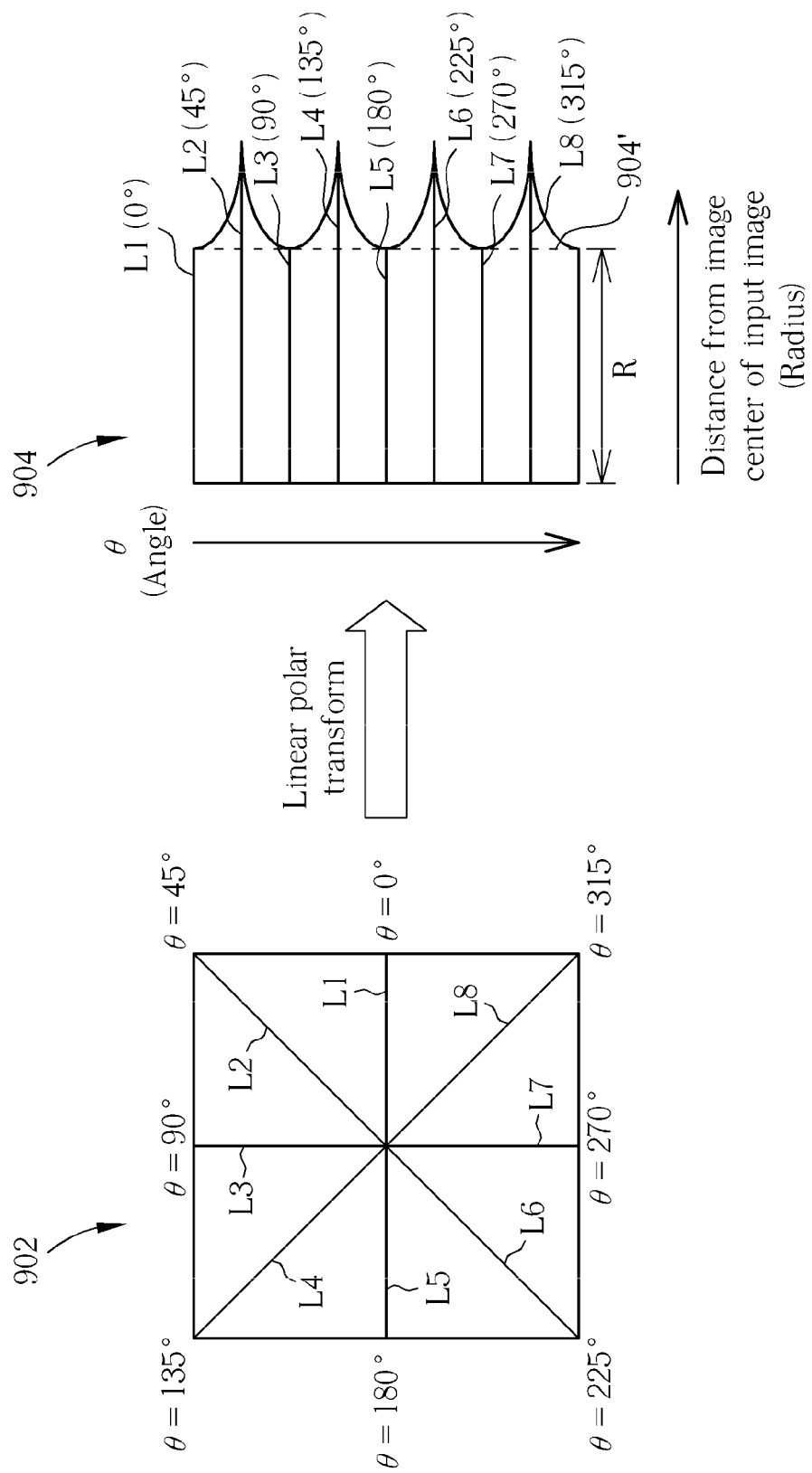
FIG. 9 is a diagram illustrating an example of the linear polar transform applied to an input image.

The transform unit 804 is arranged for performing a specific transform upon the first down-scaled image F_1' and the second down-scaled image F_2' to generate a first transformed image FT_1 and a second transformed image FT_2, respectively. In this embodiment, the specific transform performed by the transform unit 804 may be a linear polar transform. Please refer to FIG. 9, which is a diagram illustrating an example of the linear polar transform applied to an input image 902. The input image 902 may be one of the first down-scaled image F_1' and the second down-scaled image F_2'. The linear polar transform is used to transform the input image 902 from a Cartesian coordinate system to a transformed image 904 in a polar coordinate system. The polar coordinate system is a two-dimensional coordinate system in which each point in the transformed image 904 is determined by a distance from a fixed point (e.g., an image center of the input image 902) and an angle from a fixed direction. As shown in FIG. 9, the line segment L1 with an angle of 0° in the input image 902 is the first row of the transformed image 904. By gathering line segments with different angles in the counterclockwise direction, the transformed image 904 is created correspondingly.

The global motion estimation unit 806 is arranged for generating the global motion information INF by performing global motion estimation according to the first transformed image FT_1 and the second transformed image FT_2. As shown in FIG. 9, the transformed image 904 may have rows with different lengths due to the fact that the input image 902 is, for example, a square image. To facilitate the global motion estimation, a partial rectangular image 904' with rows each having the same length R is cropped from the transformed image 904. Therefore, the global motion estimation unit 806 generates the global motion information INF by performing global motion estimation upon one partial rectangular image derived from the first transformed image FT_1 and another partial rectangular image derived from the second transformed image FT_2, where the partial rectangular images have the same size.

With the help of the linear polar transform, the rotation is transformed to the movement in the Y-axis (if the Y-axis is used to represent the angle as shown in FIG. 9) or the movement in the X-axis (if the X-axis is used to represent the angle). In other words, the global motion estimation unit 806 is allowed to perform the global motion estimation in one direction only. Hence, in this embodiment, the roll related information (e.g., roll angle) can be easily determined by only referring to the global motion vector found in the Y-axis. For example, a central image with a size of 70×50 and a search range of the image from −10 to +10 in the Y direction may be employed by the global motion estimation unit 806 to find the Y-axis motion vector for the aforementioned partial rectangular images.

Figure 8:
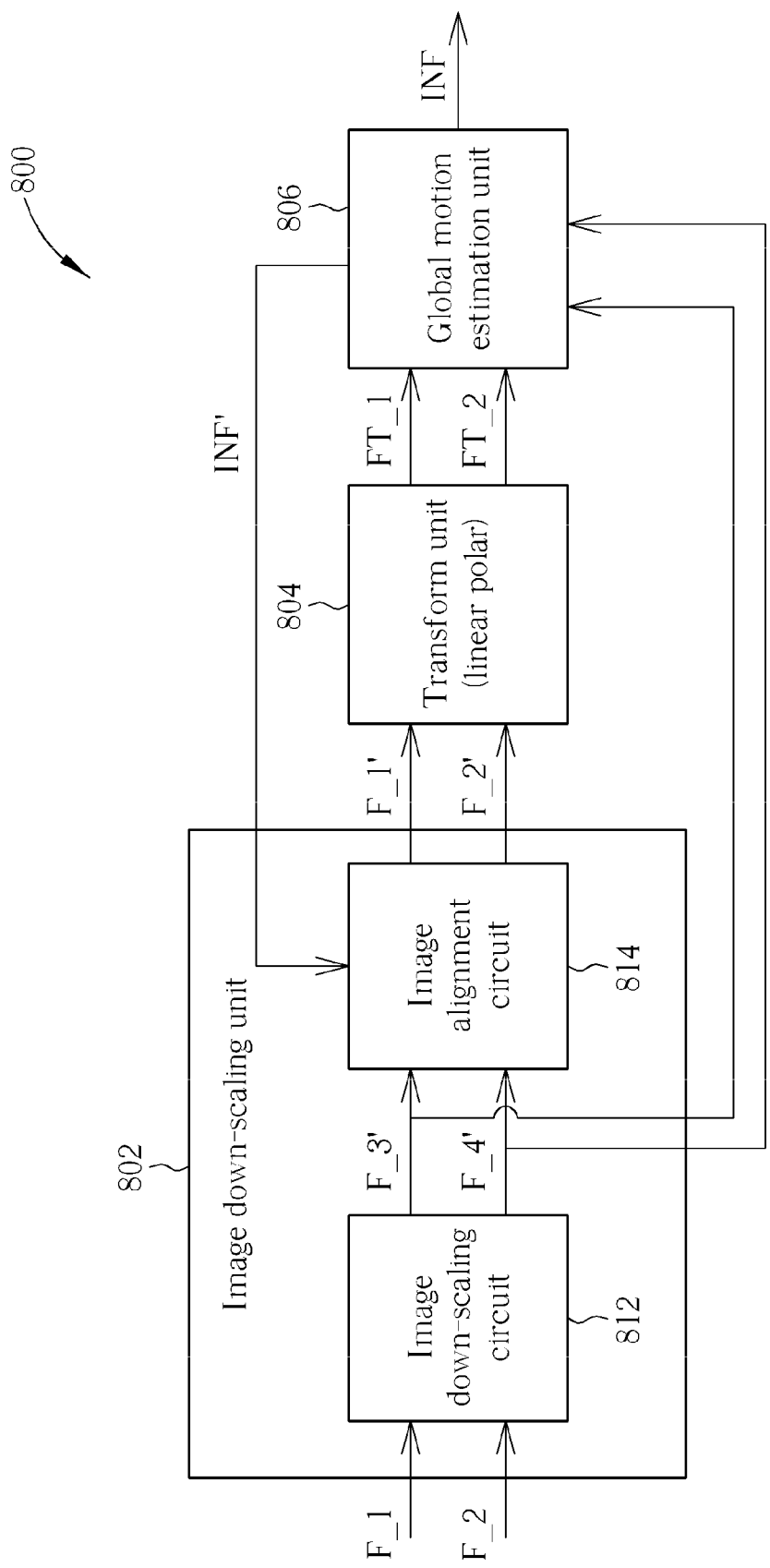
FIG. 8 is a diagram illustrating a third exemplary implementation of the global motion estimation block shown in FIG. 2.

As shown in FIG. 8, the image down-scaling unit 802 may include an image down-scaling circuit 812 and an image alignment circuit 814. The image down-scaling circuit 812 is arranged for down-scaling the first captured image F_1 and the second captured image F_2 to generate a third down-scaled image F_3' and a fourth down-scaled image F_4', respectively. Assuming that each of the first captured image F_1 and the second captured image F_2 has the size of 640×480, the image down-scaling circuit 812 may be configured to resize the first captured image F_1 and the second captured image F_2 to make each of the third down-scaled image F_3' and the fourth down-scaled image F_4' has the size of 80×80. Please note that the image down-scaling unit 802 may be optional. For example, in a case where the camera system 102 which generates the captured images F_1 and F_2 is equipped with the capability of adjusting/changing the image size when capturing images, the down-scaled images F_3' and F_4' may be directly provided by the camera system 102, and the image down-scaling unit 802 may be omitted.

The global motion estimation unit 806 may further generate another global motion information INF' by performing global motion estimation upon the third down-scaled image F_3' and the fourth down-scaled image F_4'. The image alignment circuit 814 is arranged for generating the first down-scaled image F_1' and the second down-scaled image F_2' by performing image alignment upon the third down-scaled image F_3' and the fourth down-scaled image F_4' according to the global motion information INF'. As mentioned above, each row of the transformed image 904 shown in FIG. 9 starts from the image center of the input image 902 to the edge of the input image 902 in a radial direction. In a case where there is camera roll as well as camera yaw/pitch, an object in the image center of the first captured image F_1 is shifted from the image center of the second captured image F_2. If no image alignment is applied before the linear polar transform is performed, the accuracy of the global motion vector found by the global motion estimation unit 806 may be degraded. In this exemplary embodiment, the global motion information INF' may be a motion vector indicative of the estimated image misalignment between the third down-scaled image F_3' and the fourth down-scaled image F_4'. Thus, the image alignment circuit 814 refers to the global motion information INF' to align the third down-scaled image F_3' and the fourth down-scaled image F_4'. When the search range is from −10 to +10, the image alignment circuit 814 would generate aligned images each having the size of 70×70 by discarding non-overlapped pixels. In this way, the aligned images (i.e., the first down-scaled image F_1' and the second down-scaled image F_2') would have the same image content aligned in respective image centers, thereby improving the accuracy of the global motion vector found by the global motion estimation unit 806. It should be noted that, when the global motion estimation block 202 is implemented using the global motion estimation block 800, the processor 204 may derive the yaw/pitch related information (e.g., the yaw/pitch angle)

from the global motion information INF', and may derive the roll related information (e.g., the roll angle) from global motion information INF.

In another case where there is only camera roll with camera yaw/pitch absent, the first captured image F_1 and the second captured image F_2 would have the same image content aligned in respective image centers. In one exemplary design, the image alignment circuit 814 may generate the first down-scaled image F_1' and the second down-scaled image F_2' by performing the same image alignment process according to the third down-scaled image F_3', the fourth down-scaled image F_4' and the global motion information INF'. In another exemplary design, the image alignment circuit 814 may directly bypass the third down-scaled image F_3' as the first down-scaled image F_1', and directly bypass the fourth down-scaled image F_4' as the second down-scaled image F_2'.

Figure 10:
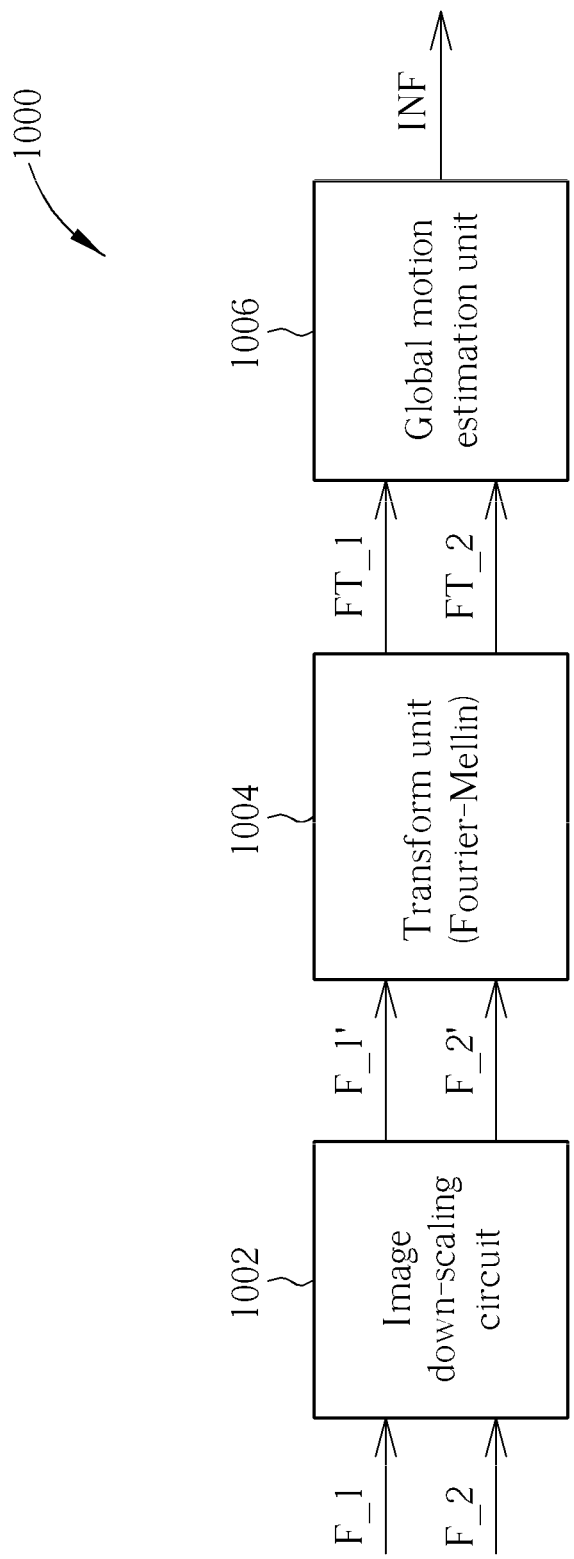
FIG. 10 is a diagram illustrating a fourth exemplary implementation of the global motion estimation block shown in FIG. 2.

As can be known from above description, the additional image alignment step may be required to improve the motion vector accuracy when the specific transform employed by the transform unit 804 is a linear polar transform. In practice, the specific transform employed by the transform unit 804 is not limited to the linear polar transform. For example, the transform unit 804 in FIG. 8 may be modified to replace the employed linear polar transform with a Log-polar transform. Besides, the additional image alignment step may be omitted when the specific transform employed by the transform unit 804 has the image alignment effect inherently. For example, in an alternative design, the specific transform employed by the transform unit 804 may be a Fourier-Mellin transform. Please refer to FIG. 10, which is a diagram illustrating a fourth exemplary implementation of the global motion estimation block 202 shown in FIG. 2. The global motion estimation block 202 may be realized using the global motion estimation block 1000, where the global motion estimation block 1000 includes an image down-scaling unit 1002, a transform unit 1004 and a global motion estimation unit 1006. The image down-scaling unit 1002 is arranged for generating a first down-scaled image F_1' of a first captured image F_1 and generating a second down-scaled image F_2' of a second captured image F_2. The first captured image F_1 and the second captured image F_2 are consecutive captured images. For example, the first captured image F_1 is a previous image, and the second captured image F_2 is a current image which is captured immediately after the previous image is captured. In this embodiment, the image down-scaling unit 1002 directly down-scales the first captured image F_1 to generate the first down-scaled image F_1', and directly down-scales the second captured image F_2 to generate the second down-scaled image F_2'. That is, there is no image alignment operation performed by the image down-scaling unit 1002. Assuming that each of the first captured image F_1 and the second captured image F_2 has the size of 640×480, the image down-scaling unit 1002 may resize the first captured image F_1 and the second captured image F_2 to make each of the first down-scaled image F_1' and the second down-scaled image F_2' have the size of 80×80. Please note that the image down-scaling circuit 1002 may be optional. For example, in a case where the camera system 102 which generates the captured images F_1 and F_2 is equipped with the capability of adjusting/changing the image size when capturing images, the down-scaled images F_1' and F_2' may be directly provided by the camera system 102, and the image down-scaling circuit 1002 may be omitted.

Figure 11:
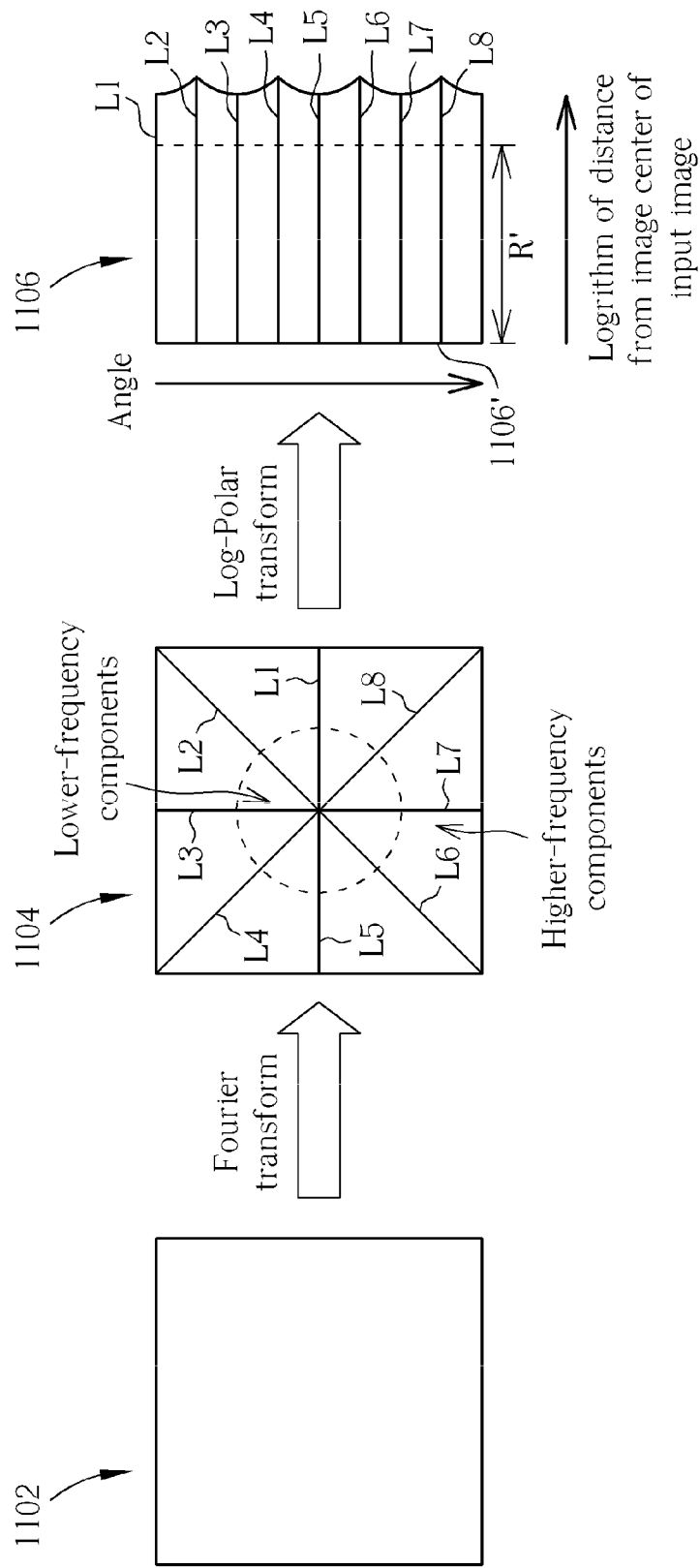
FIG. 11 is a diagram illustrating an example of the Fourier-Mellin transform applied to an input image.

The transform unit 1004 is arranged for performing a specific transform upon the first down-scaled image F_1' and the second down-scaled image F_2' to generate a first transformed image FT_1 and a second transformed image FT_2, respectively. In this embodiment, the specific transform is a Fourier-Mellin transform. Please refer to FIG. 11, which is a diagram illustrating an example of the Fourier-Mellin transform applied to an input image 1102. The input image 1102 may be one of the first down-scaled image F_1' and the second down-scaled image F_2'. The Fourier-Mellin transform includes a Fourier transform and a Log-polar transform which are performed in order. As shown in FIG. 11, the input image 1102 is first converted into a Fourier-transformed image 1104 according to the Fourier transform. In accordance with the inherent characteristics of the Fourier transform, transform outputs corresponding to lower-frequency components in the input image 1102 are located at positions close to the image center of the Fourier-transformed image 1104, and transform outputs corresponding to higher-frequency components in the input image 1102 are located at positions far away from the image center of the Fourier-transformed image 1104. Thus, as the image center of the Fourier-transformed image would always correspond to the lowest-frequency component of the input image 1102, the Fourier transform therefore has the desired image alignment effect. Next, the Log-polar transform is applied to the Fourier-transformed image 1104. The Log-polar transform is used to transform the Fourier-transformed image 1104 from a transform domain to a Log-polar transformed image 1106 in another transform domain (i.e., a Log-polar coordinate system). The Log-polar coordinate system is a two-dimensional coordinate system in which each point in the transformed image 1106 is determined by the logarithm of a distance from a fixed point (e.g., an image center of the Fourier-transformed image 1104) and an angle from a fixed direction. As shown in FIG. 11, the line segment L1 with an angle of 0° in Fourier-transformed image 1104 is the first row of the Log-polar-transformed image 1106. By gathering line segments with different angles in the counterclockwise direction, the Log-polar-transformed image 1106 is created correspondingly. The major difference between the linear polar transform and the Log-polar transform is that the Log-polar transform uses the logarithm of the distance from the image center of the Fourier-transformed image 1104 to preserve Fourier transform outputs of the low-frequency components, and reduce Fourier transform outputs of the high-frequency components for noise reduction. As a person skilled in the art should readily understand operation of the Log-polar transform after reading above paragraphs directed to the exemplary linear polar transform shown in FIG. 9, further description is omitted here for brevity.

The global motion estimation unit 1006 is arranged for generating the global motion information INF by performing global motion estimation according to the first transformed image FT_1 and the second transformed image FT_2. As shown in FIG. 11, the transformed image 1106 may have rows with different lengths due to the fact that the input image 1102 is a square image. To facilitate the following global motion estimation, a partial rectangular image 1106' with rows each having the same length R' is extracted from the transformed image 1106. Therefore, the global motion estimation unit 1006 generates the global motion information INF by performing global motion estimation upon one partial rectangular image derived from the first transformed image FT_1 and another partial rectangular image derived from the second transformed image FT_2, where the partial rectangular images have the same size.

With the help of the Fourier-Mellin transform, the roll related information (e.g., roll angle) can be easily determined by referring to the global motion vector in one direction only. In this embodiment, as the Y-axis is used to represent the angle, the roll related information (e.g., roll angle) is determined by the motion vector fond in the Y direction. For example, an image with a size of 80×60 and a search range of the image from −10 to +10 in the Y direction may be employed by the global motion estimation unit 806 to find the Y-axis motion vector for the aforementioned partial rectangular images. It should be noted that, when the global motion estimation block 202 is implemented using the global motion estimation block 1000, the processor 204 may derive the yaw/pitch related information (e.g., the yaw/pitch angle) from global motion information INF' obtained using the aforementioned means, and may derive the roll related information (e.g., the roll angle) from global motion information INF.

In above embodiments of generating the global motion information INF used for determining the roll related information, a global motion estimation unit (e.g., an EIS module) is used for perform the desired global motion estimation. However, these are for illustrative purposes only, and are not meant to be limitations of the present invention. That is, the global motion information INF indicative of the rotation status of camera roll may be derived from using other means/algorithms.

Figure 12:
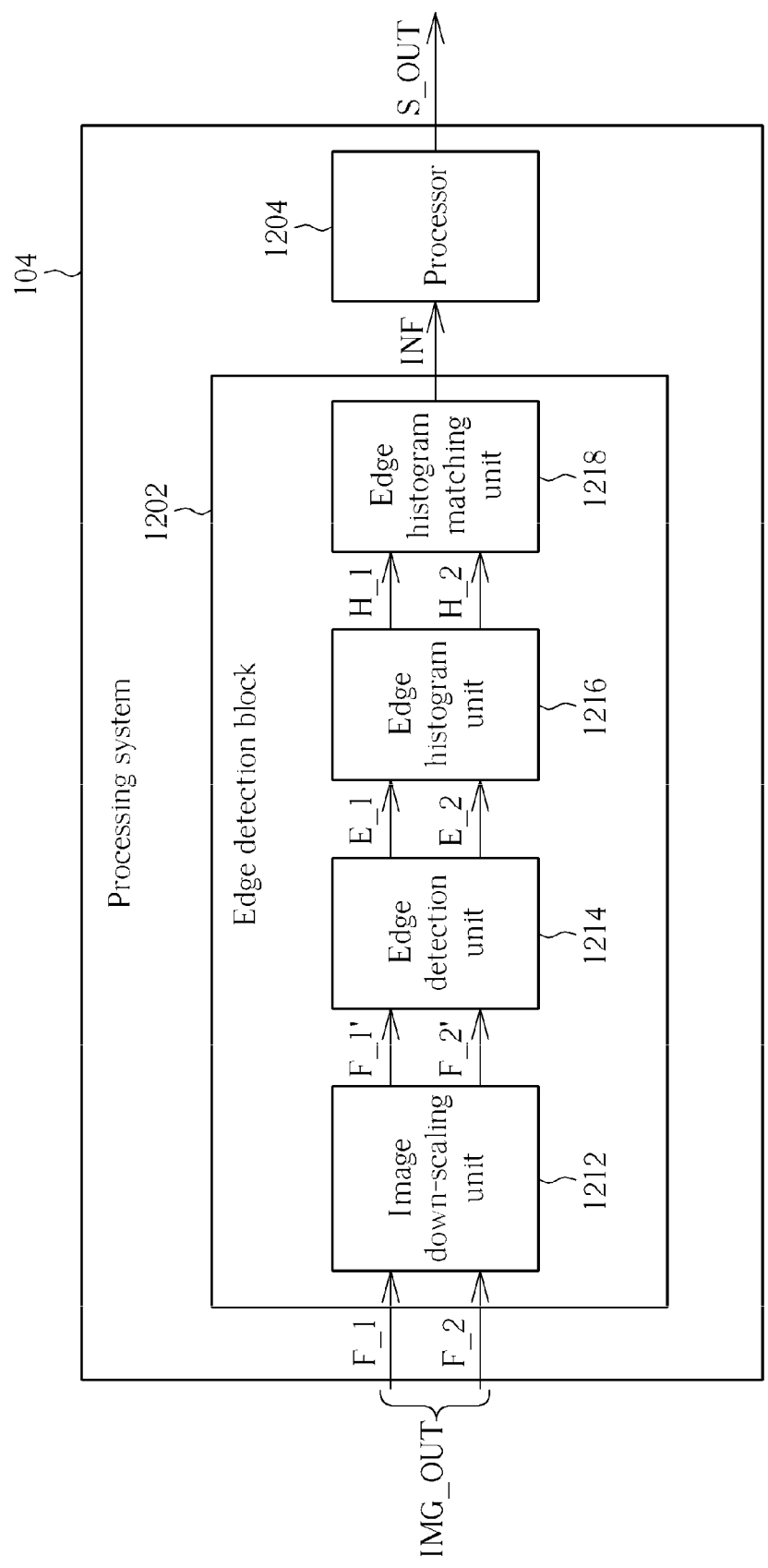
FIG. 12 is a diagram illustrating another exemplary implementation of the processing system shown in FIG. 1.

Please refer to FIG. 12, which is a diagram illustrating another exemplary implementation of the processing system 104 shown in FIG. 1. The processing system 104 includes an edge detection block 1202 and a processor 1204. The edge detection block 1202 is arranged for generating global motion information INF by performing edge detection according to the image output IMG_OUT. The processor 1204 is arranged for determining the motion sensor output S_OUT according to the global motion information INF. In this embodiment, the edge detection block 1202 includes an image down-scaling unit 1212, an edge detection unit 1214, an edge histogram unit 1216, and an edge histogram matching unit 1218. The image down-scaling unit 1212 is arranged for down-scaling a first captured image F_1 and a second captured image F_2 to generate a first down-scaled image F_1' and a second down-scaled image F_2', respectively. The first captured image F_1 and the second captured image F_2 are consecutive captured images. For example, the first captured image F_1 is a previous image, and the second captured image F_2 is a current image which is captured immediately after the previous image is captured. Assume that each of the first captured image F_1 and the second captured image F_2 has a size of 640×480. The image down-scaling unit 1212 may apply the same down-scaling factor to the horizontal resolution and the vertical resolution due to the fact that the global motion information INF is determined according to edge information rather than motion vector information. For example, the image down-scaling unit 1212 may resize the first captured image F_1 and the second captured image F_2 to make each of the first down-scaled image F_1' and the second down-scaled image F_2' have the size of 80×60. Please note that the image down-scaling unit 1212 may be optional. For example, in a case where the camera system 102 which generates the captured images F_1 and F_2 is equipped with the capability of adjusting/changing the image size when capturing images, the down-scaled images F_1' and F_2' may be directly provided by the camera system 102, and the image down-scaling unit 1212 may be omitted.

The edge detection unit 1214 is arranged for performing edge detection upon the first down-scaled image F_1' to generate first edge information E_1, and performing edge detection upon the second down-scaled image F_2' to generate second edge information E_2. By way of example, the first edge information E_1 may include an angle value and a magnitude value of each pixel in the first down-scaled image F_1', and the second edge information E_2 may also include an angle value and a magnitude value of each pixel in the second down-scaled image F_2'. In this embodiment, the edge detection unit 1214 employs a Sobel operator to detect horizontal changes and vertical changes, where the Sobel operator uses 3×3 kernel $K_X$, $K_Y$ which are convolved with a source image A (e.g., each of the first down-scaled image F_1' and second down-scaled image F_2'). Based on the Sobel operator outputs $G_X$, $G_Y$, the angle value θ and the magnitude value G of each pixel in the source image A can be easily obtained. The operation of the edge detection unit 1214 can be expressed by following formulas.

$$G_X = K_X * A \quad (1)$$

$$= \begin{bmatrix} -1 & 0 & +1 \\ -2 & 0 & +2 \\ -1 & 0 & +1 \end{bmatrix} * A$$

$$G_Y = K_Y * A \quad (2)$$

$$= \begin{bmatrix} -1 & -2 & -1 \\ 0 & 0 & 0 \\ +1 & +2 & +1 \end{bmatrix} * A$$

$$\Theta = \arctan\left(\frac{G_Y}{G_X}\right) \quad (3)$$

$$G = \sqrt{G_X^2 + G_Y^2} \quad (4)$$

The edge histogram unit 1216 is arranged for deriving a first edge histogram H_1 from the first edge information E_1, and deriving a second edge histogram H_2 from the second edge information E_2. In this embodiment, the edge histogram is generated by dividing the angle into 360 bins, and adding magnitude to corresponding bins for each pixel. The resulting edge histogram has 360 bins, and each bin denotes accumulated magnitude of one degree. In other words, regarding each of the first edge information E_1 and the second edge information E_2, magnitude values of pixels with the same angle value are accumulated to determine the accumulated magnitude of one bin (i.e., one angle) in the corresponding edge histogram H_1/H_2.

Figure 13:
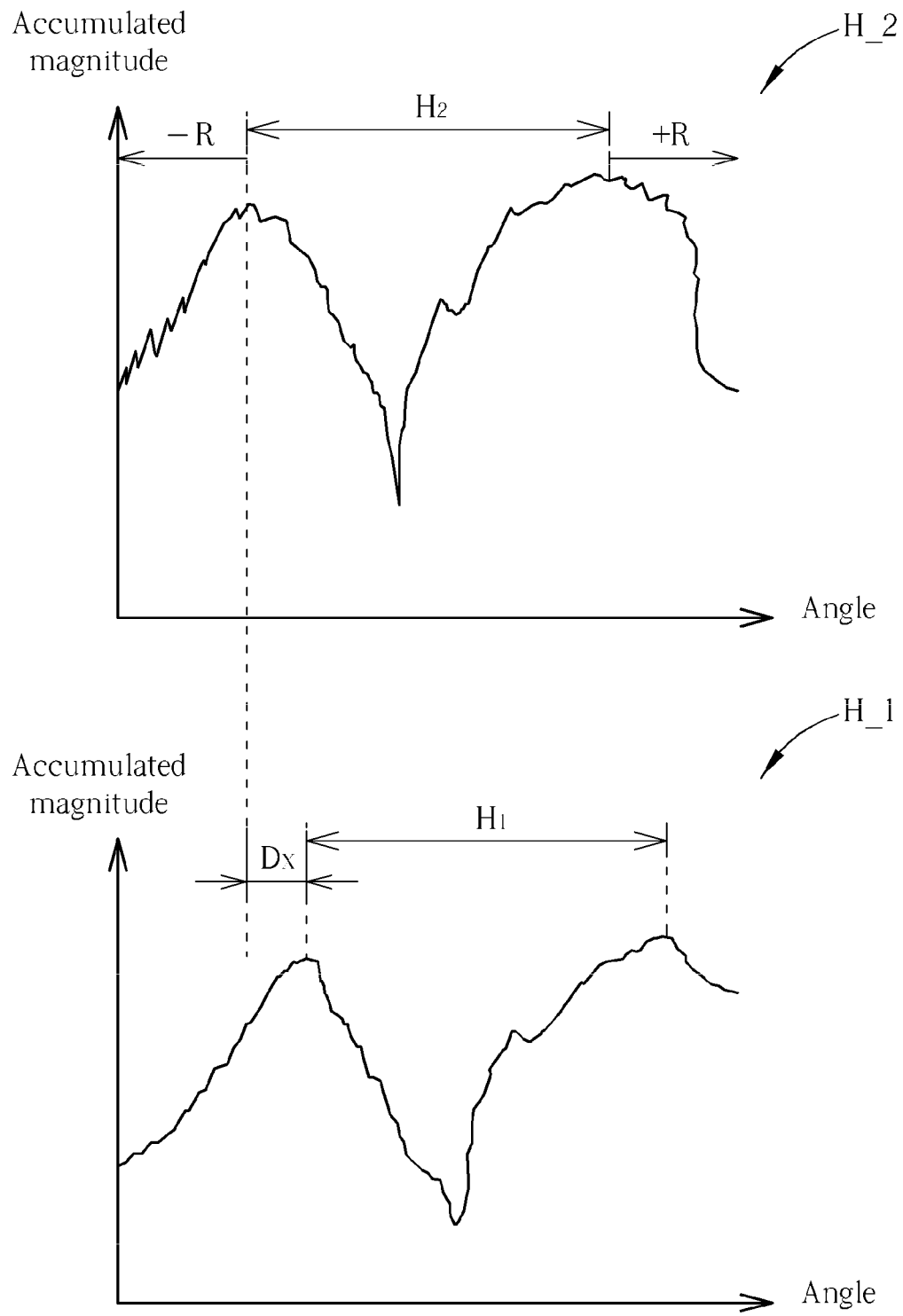
FIG. 13 is a diagram illustrating an example of the edge histogram matching performed by the edge histogram matching unit.

When there is camera roll, an angle value of an original edge present in the first captured image F_1 is different from an angle value of the corresponding rotated edge present in the second captured image F_2; however, a magnitude value of the original edge present in the first captured image F_1 is almost the same as a magnitude value of the corresponding rotated edge present in the second captured image F_2. Based on such an observation, the roll related information (e.g., a roll angle) can be easily determined according to a comparison result of comparing the first edge histogram H_1 with the second edge histogram H_2. Hence, the edge histogram matching unit 1218 is arranged for generating the aforementioned global motion information INF by performing edge histogram matching upon the first edge histogram H_1 and the second edge histogram H_2. FIG. 13 is a diagram illustrating an example of the edge histogram matching performed by the edge histogram matching unit

1218. The edge histogram matching unit 1218 may employed a search range from −R to +R to search a partial edge histogram H$_2$ of the current image from the first edge histogram H_1 of the previous image. When the partial edge histogram H$_1$ of the previous image matches the partial edge histogram H$_2$ of the current image, the shifting value D$_X$ in the X-axis is indicative of the roll angle between the previous image and the current image. Hence, the edge histogram matching unit 1218 may output the shifting value D$_X$ as the global motion information INF. It should be noted that the yaw/pitch related information (e.g., the yaw/pitch angle) may be derived from global motion information INF' obtained using aforementioned means, and the roll related information (e.g., the roll angle) may be derived from global motion information INF obtained using the edge detection block 1202.

To reduce or remove the undesired noise interference, the edge histogram unit 1216 may be configured for performing a filtering operation upon the first edge histogram and the second edge histogram before the first edge histogram H_1 and the second edge histogram H_2 are transmitted to the following edge histogram matching unit 1218.

After the global motion information INF is obtained by using the global motion estimation block 202 shown in FIG. 2 or the edge detection block 1202 shown in FIG. 12, the processor 204/1204 refers to the global motion information INF to determine the motion sensor output S_OUT which may indicate the movement status and/or rotation status of the image-based motion sensor 100. Besides, the processor 204/1204 may further identify the user action according to the motion sensor output S_OUT. In a case where the image-based motion sensor 100 is disposed in a portable electronic device (e.g., a mobile phone), the image-based motion sensor 100 may act as a user input device. For example, the user actions to be detected by the image-based motion sensor 100 may include slow movement actions (e.g., slow_up, slow_down, slow_left and slow_right), fast movement actions (e.g., fast_up, fast_down, fast_left, and fast_right), and rotation actions (e.g., rotate_clockwise and rotate_counterclockwise). However, this is for illustrative purposes only, and is not meant to be a limitation of the present invention.

It should be noted that "fast_right", "fast_left", "fast_up", "fast_down", "slow_right", "slow_left", "slow_up", "slow_down", "rotate_clockwise" and "rotate_counterclockwise" are defined in terms of movement/rotation of the whole portable device. Hence, the moving/rotating direction of captured images depends on the position and orientation of the used camera on the portable device. For example, in a first case where the user holds the portable device with zero-degree rotation and then moves the portable device rightward and then leftward, the proposed image-based motion sensor using a front camera may detect rightward movement and then leftward movement, while the proposed image-based motion sensor using a rear camera may detect leftward movement and then rightward movement. In a second case where the user holds the portable device with 90-degree clockwise rotation and then moves the portable device rightward and then leftward, the proposed image-based motion sensor using a front camera may detect upward movement and then downward movement, while the proposed image-based motion sensor using a rear camera may detect downward movement and then upward movement. In a third case where the user holds the portable device with 90-degree counterclockwise rotation and then moves the portable device rightward and then leftward, the proposed image-based motion sensor using a front camera may detect downward movement and then upward movement, while the proposed image-based motion sensor using a rear camera may detect upward movement and then downward movement. In a fourth case where the user holds the portable device with 180-degree clockwise/counterclockwise rotation and then moves the portable device rightward and then leftward, the proposed image-based motion sensor using a front camera may detect leftward movement and then rightward movement, while the proposed image-based motion sensor using a rear camera may detect rightward movement and then leftward movement. Besides, in a case where the user rotates the portable device clockwise, the proposed image-based motion sensor using a front camera may detect clockwise rotation, while the proposed image-based motion sensor using a rear camera may detect counterclockwise rotation. In another case where the user rotates the portable device counterclockwise, the proposed image-based motion sensor using a front camera may detect counterclockwise rotation, while the proposed image-based motion sensor using a rear camera may detect clockwise rotation. Therefore, one of the user actions (e.g., "fast_right", "fast_left", "fast_up", "fast_down", "slow_right", "slow_left", "slow_up", "slow_down", "rotate_clockwise" and "rotate_counterclockwise") performed upon the whole portable device should be determined with consideration of actual position and orientation of the used camera on the portable device.

Figure 14:
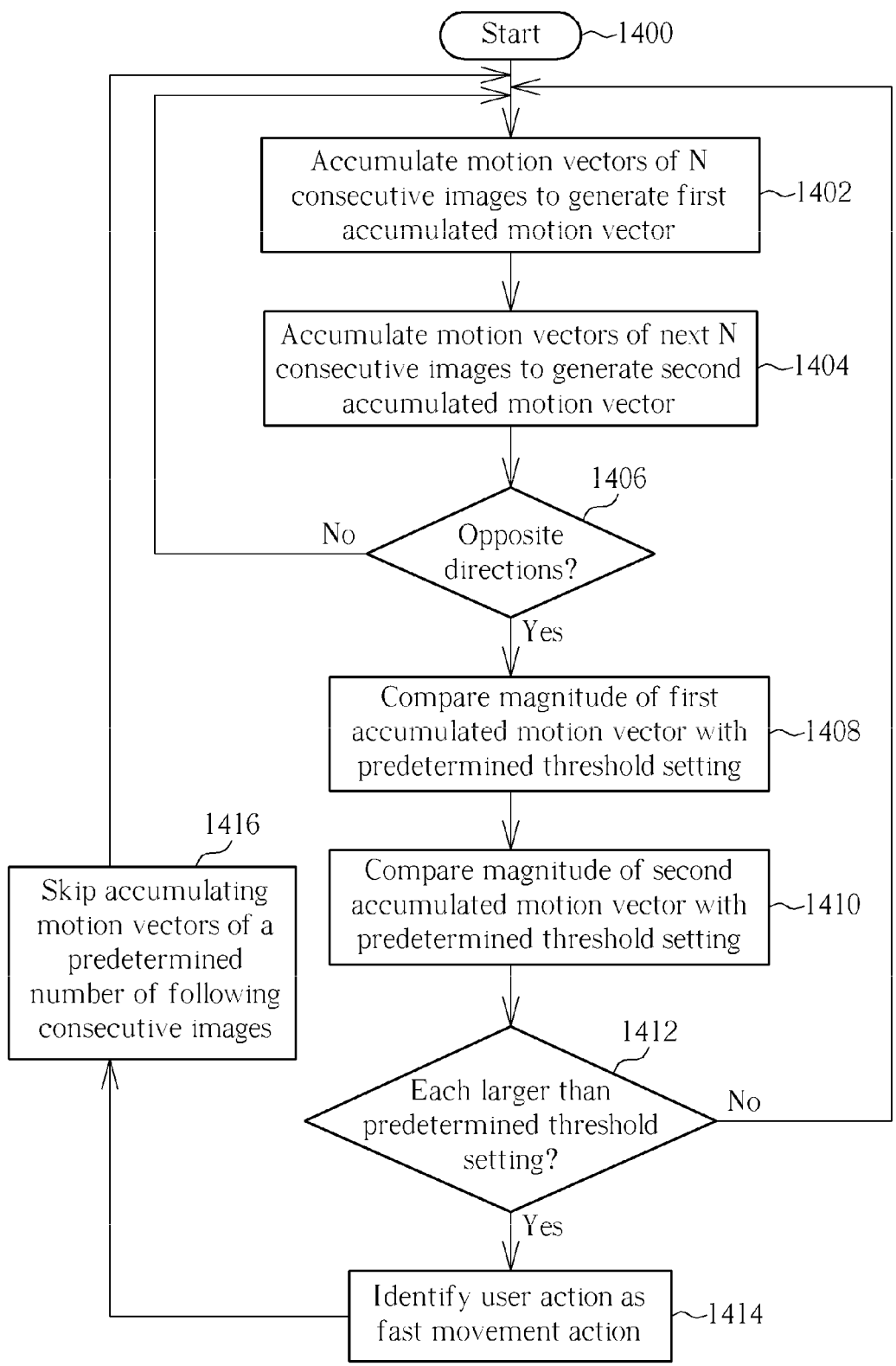
FIG. 14 is a flowchart illustrating a method of detecting a fast movement action according to an embodiment of the present invention.

Regarding determination of the fast movement action, the motion sensor output S_OUT may include a motion vector of each captured image in the image output IMG_OUT, and the motion vectors may be accumulated to identify the fast movement action entered by the user. Specifically, the processor 204/1204 generates a plurality of accumulated motion vectors each derived from accumulating motion vectors of consecutive captured images, and identifies a fast movement action according to the accumulated motion vectors. FIG. 14 is a flowchart illustrating a method of detecting a fast movement action according to an embodiment of the present invention. Provided that the result is substantially the same, the steps are not required to be executed in the exact order shown in FIG. 14. The detection of the fast movement action may be briefly summarized as below.

Step 1400: Start.

Step 1402: Accumulate motion vectors of N consecutive images to generate a first accumulated motion vector.

Step 1404: Accumulate motion vectors of the next N consecutive images to generate a second accumulated motion vector.

Step 1406: Check if direction of the second accumulated motion vector is opposite to direction of the first accumulated motion vector. If yes, go to step 1408; otherwise, go to step 1402 to keep processing motion vectors of following consecutive images.

Step 1408: Compare magnitude of the first accumulated motion vector with a predetermined threshold setting.

Step 1410: Compare magnitude of the second accumulated motion vector with the predetermined threshold setting.

Step 1412: Check if the magnitude of each of the first accumulated motion vector and the second accumulated motion vector is larger than the predetermined threshold setting. If yes, go to step 1414; otherwise, go to step 1402 to keep processing motion vectors of following consecutive images.

Step 1414: Identify the user action as a fast movement action.

Step 1416: Skip accumulating motion vectors of a predetermined number of following consecutive images. Next, go to step 1402 to keep detecting the next user action.

The user may perform the fast movement action by moving the portable device in opposite directions quickly. The fast movement action may be identified as a "fast_right" action when the portable device quickly moves rightward and then leftward. The fast movement action may be identified as a "fast_left" action when the portable device quickly moves leftward and then rightward. The fast movement action may be identified as a "fast_up" action when the portable device quickly moves upward and then downward. The fast movement action may be identified as a "fast_down" action when the portable device quickly moves downward and then upward. The processor 204/1204 obtains a first accumulated motion vector and a second accumulated motion vector when receiving motion vectors of 2*N consecution images, where the first accumulated motion vector is derived from accumulating N motion vectors (step 1402), and the second accumulated motion vector is derived from accumulating following N motion vectors (step 1404). For example, the value of N may be equal to 3. Besides, the accumulated motion vectors in steps 1402 and 1404 are all motion vector components in the X-axis for detection of the "fast_left" action and "fast_right" action, or the accumulated motion vectors in steps 1402 and 1404 are all motion vector components in the Y-axis for detection of the "fast_up" action and "fast_down" action.

Next, the processor 204/1204 checks the direction of the first accumulated motion vector and the direction of the second accumulated motion vector (step 1406). If the direction of the first accumulated motion vector is identical to the direction of the second accumulated motion vector, this implies that there is no fast movement action due to the fact that the portable device moves in the same direction, instead of opposite directions, during the monitored period. Thus, the flow proceeds with step 1402 to keep processing motion vectors of following images (step 1406). However, if the direction of the first accumulated motion vector is found opposite to the direction of the second accumulated motion vector, the magnitude of the first accumulated motion vector and the magnitude of the second accumulated motion vector would be checked (steps 1408 and 1410). If the maximum motion vector derived from two consecutive images is 10 and the value of N is 3, the predetermined threshold setting may be set by 28. When at least one of the first accumulated motion vector and second accumulated motion vector does not have the magnitude larger than 28, this implies that there is no fast movement action due to the fact that the portable device does not move quickly in opposite directions. The flow therefore proceeds with step 1402 to keep processing motion vectors of following images. However, when each of the first accumulated motion vector and second accumulated motion vector has the magnitude larger than 28, this implies that the user moves the portable device in opposite directions quickly. Hence, the processor 204/1204 refers to the order of the direction of the first accumulated motion vector and the direction of the second accumulated motion vector to identify the fast movement action as one of the "fast_left" action, "fast_right" action, "fast_up" action and "fast_down" action (step 1414).

It should be noted that the user interface (UI) may need time to respond to the detected fast movement action, and the time of actual movement of the portable device and the time of user's fast movement action may not be the same due to user inertia when the portable device is moving. In this embodiment, after one fast movement action is determined in step 1414, the processor 204/1204 is operative to skip accumulating motion vectors of a predetermined number of following consecutive images (step 1416). For example, the processor 204/1204 may skip 15 consecutive images. Besides, when step 1416 is executed, it also avoid detecting continuous actions for the same user input.

It should be noted that the flow in FIG. 14 checks the motion vector direction and then the motion vector magnitude. Alternatively, the flow in FIG. 14 may be modified to check the motion vector magnitude and then the motion vector direction. Therefore, when at least one of the first accumulated motion vector and second accumulated motion vector is not large enough, the processor 204/1204 determines that there is no fast movement action. After it is determined that each of the first accumulated motion vector and second accumulated motion vector has large magnitude, the direction of the first accumulated motion vector and the direction of the second accumulated motion vector are checked. The same objective of identifying the fast movement action is achieved.

Figure 15:
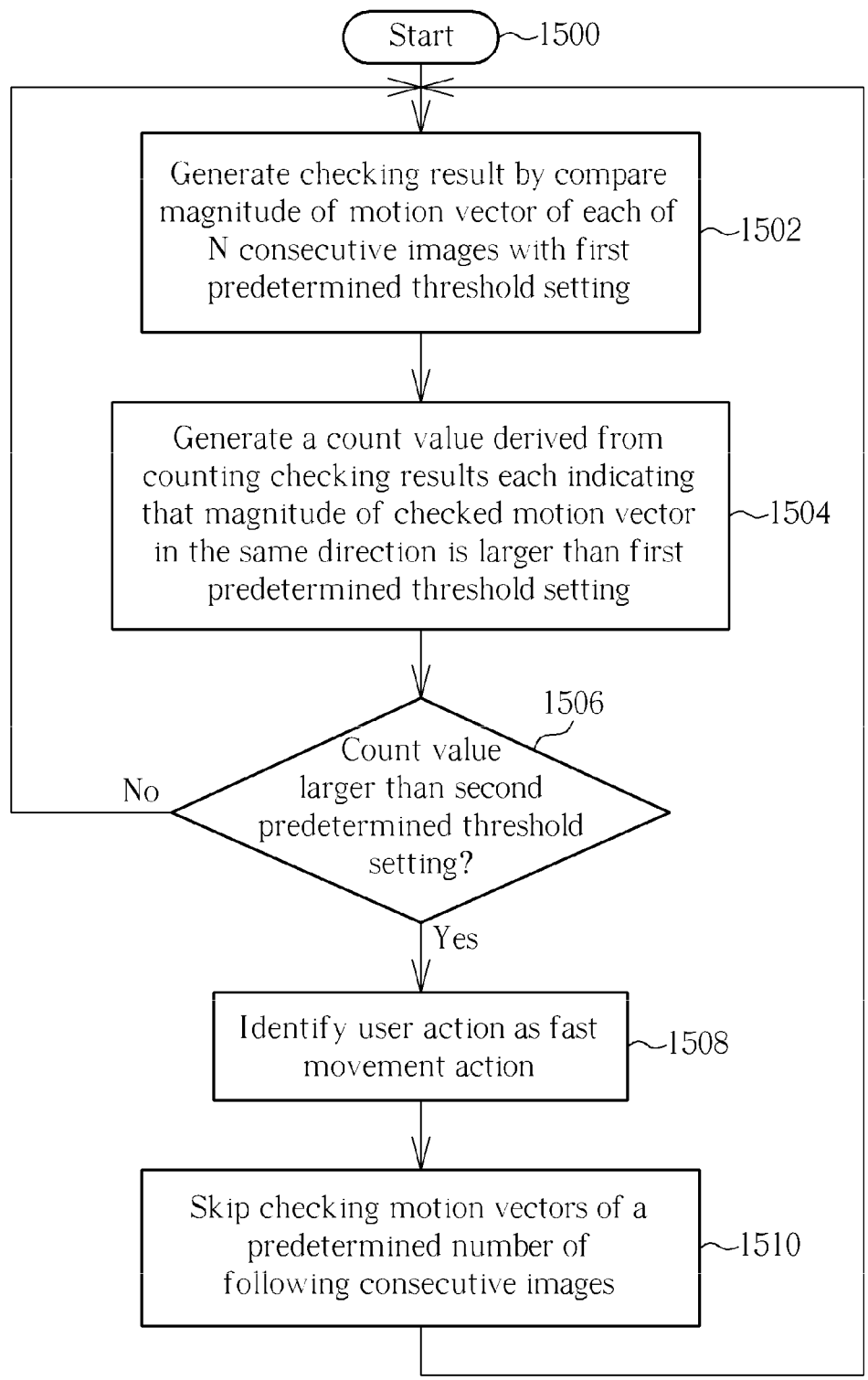
FIG. 15 is a flowchart illustrating another method of detecting a fast movement action according to an embodiment of the present invention.

In above example, the fast movement action is defined as a user action which moves the portable device in opposite direction quickly. In an alternative design, the fast movement action may be defined as a user action which moves the portable device in the same direction quickly. Regarding determination of such a fast movement action, the motion sensor output S_OUT includes a motion vector of each captured image in the image output IMG_OUT, and the motion vector of each captured image may be checked to determine the fast movement action. Specifically, the processor 204/1204 checks the motion vector of each of consecutive captured images to generate a checking result, and identifies the fast movement action according to a plurality of checking results of the consecutive captured images. FIG. 15 is a flowchart illustrating another method of detecting a fast movement action according to an embodiment of the present invention. Provided that the result is substantially the same, the steps are not required to be executed in the exact order shown in FIG. 15. The detection of the fast movement action may be briefly summarized as below.

Step 1500: Start.

Step 1502: Compare magnitude of a motion vector of each of N consecutive images with a first predetermined threshold setting, and accordingly generate a checking result.

Step 1504: Generate a count value derived from counting checking results each indicating that magnitude of a checked motion vector in the same direction is larger than the first predetermined threshold setting.

Step 1506: Check if the count value is larger than a second predetermined threshold setting by comparing the count value with the second predetermined threshold setting. If yes, go to step 1508; otherwise, go to step 1502 to keep checking motion vectors of following N consecutive images.

Step 1508: Identify the user action as a fast movement action.

Step 1510: Skip checking motion vectors of a predetermined number of following consecutive images. Next, go to step 1502 to keep detecting the next user action.

The user may perform the fast movement action by moving the portable device in the same direction quickly. The fast movement action may be identified as a "fast_right" action when the portable device quickly moves rightward. The fast movement action may be identified as a "fast_left" action when the portable device quickly moves leftward. The fast movement action may be identified as a "fast_up" action when the portable device quickly moves upward. The fast movement action may be identified as a "fast_down" action when the portable device quickly moves downward. The processor 204/1204 obtains a plurality of checking results when receiving motion vectors of N consecution images (step 1502). For example, the value of N may be equal to 6. If the maximum motion vector derived from two consecutive images is 10, the first predetermined threshold setting may be 6. Besides, the checked motion vectors in step 1502 are all motion vector components in the X-axis for detection of the "fast_left" action and "fast_right" action, or the checked motion vectors in step 1502 are all motion vector components in the Y-axis for detection of the "fast_up" action and "fast_down" action.

Next, in step 1504, the processor 204/1204 obtains a count value by counting checking results which indicate that magnitude of checked motion vectors in the same direction are larger than the first predetermined threshold setting. In other words, larger motion vectors in the same direction are counted by the processor 204/1204. If the user moves the portable device quickly, most of the motion vectors of N consecutive images should be large motion vectors whose magnitude is larger than the first predetermined threshold setting. Therefore, the processor 204/1204 compares the count value with a second predetermined threshold setting to check occurrence of the fast movement action. When the value of N is 6, the second predetermined threshold setting may be 5. If the count value is smaller than the second predetermined threshold setting, this implies that there is no fast movement action. The flow proceeds with step 1502 to keep processing motion vectors of following N consecutive images (step 1506). However, if the count value is not smaller than the second predetermined threshold setting, the processor 204/1204 refers to direction of these counted motion vectors to identify the fast movement action as one of the "fast_left" action, "fast_right" action, "fast_up" action and "fast_down" action (step 1508).

As mentioned above, the UI may need time to respond to the detected fast movement action, and the time of actual movement of the portable device and the time of user's fast movement action may not be the same due to user inertia when the portable device is moving. In this embodiment, after one fast movement action is determined in step 1508, the processor 204/1204 is operative to skip checking motion vectors of a predetermined number of following consecutive images (step 1510). For example, the processor 204/1204 may skip 15 consecutive images. Besides, when step 1510 is executed, it may avoid detecting continuous actions for the same user input.

Figure 16:
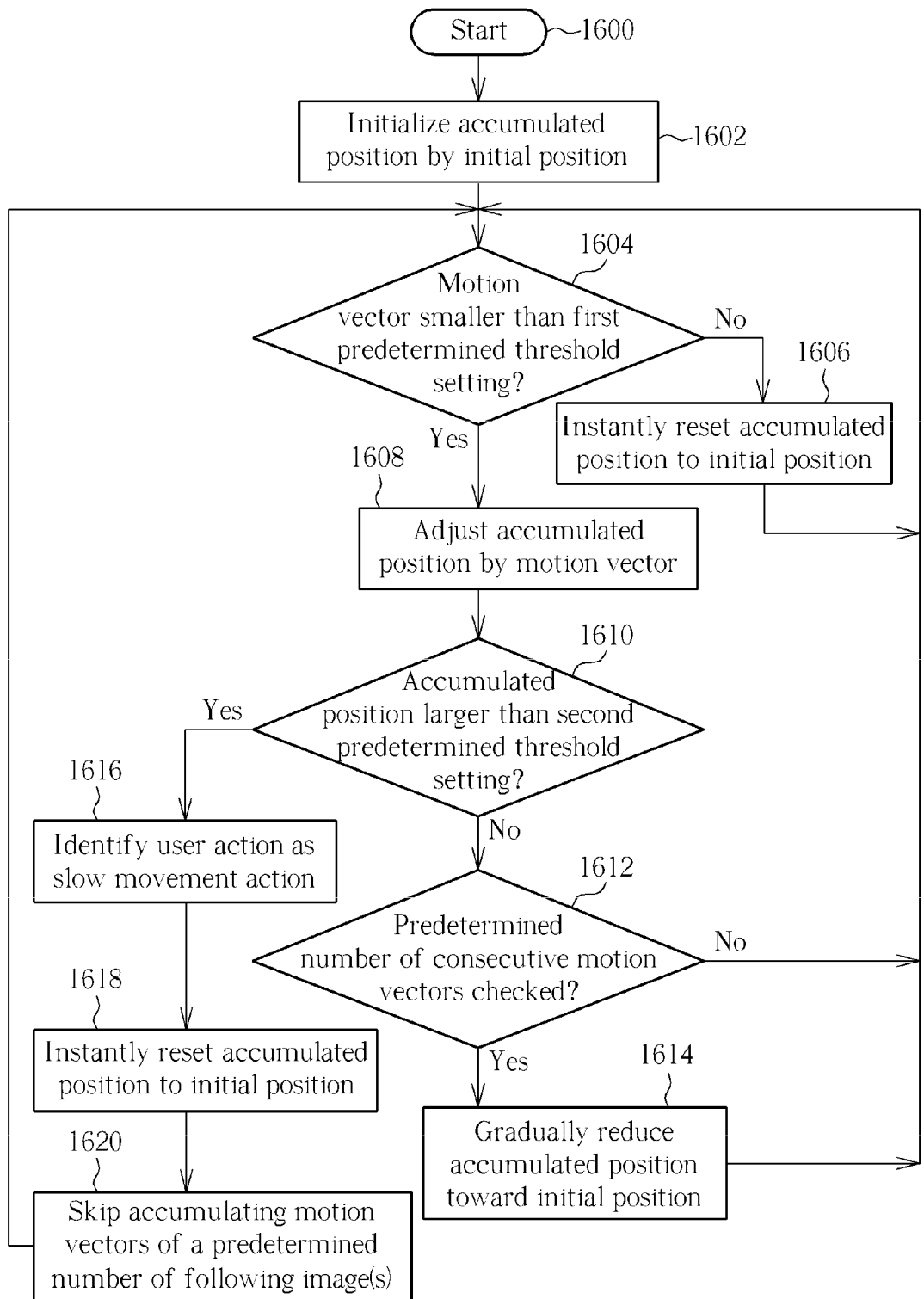
FIG. 16 is a flowchart illustrating a method of detecting a slow movement action according to an embodiment of the present invention.

In addition to the fast motion action, the processor 204/1204 may also detect the slow movement action according to the motion sensor output S_OUT that includes motion vectors of captured images in the image output IMG_OUT. Specifically, the processor 204/1204 determines an accumulated position derived accumulating motion vectors of consecutive images, and identifies a slow movement action according to the accumulated position. FIG. 16 is a flowchart illustrating a method of detecting a slow movement action according to an embodiment of the present invention. Provided that the result is substantially the same, the steps are not required to be executed in the exact order shown in FIG. 16. The detection of the slow movement action may be briefly summarized as below.

Step 1600: Start.
Step 1602: Initialize an accumulated position by an initial position.

Step 1604: Check if a motion vector of an image is smaller than a first predetermined threshold setting. If yes, go to step 1608; otherwise, go to step 1606.
Step 1606: Instantly reset the accumulated position to the initial position. Go to step 1604 to keep checking motion vector of the next image.
Step 1608: Adjust the accumulated position by the motion vector.
Step 1610: Check if the accumulated position is larger than a second predetermined threshold setting. If yes, go to step 1616; otherwise, go to step 1612.
Step 1612: Check if a predetermined number of consecutive motion vectors have been checked since the accumulated position is initialized/reset by the initial position. If yes go to step 1614; otherwise, go to step 1604 to keep checking a motion vector of a next image.
Step 1614: Gradually reduce the accumulated position toward the initial position. Go to step 1604 to keep checking motion vector of the next image.
Step 1616: Identify the user action as a slow movement action.
Step 1618: Instantly reset the accumulated position to the initial position.
Step 1620: Skip accumulating motion vectors of a predetermined number of following image(s). Next, go to step 1604 to keep checking motion vector of the next image.

The user may perform the slow movement action by moving the portable device in the same direction slowly. The slow movement action may be identified as a "slow_right" action when the portable device slowly moves rightward. The slow movement action may be identified as a "slow_left" action when the portable device slowly moves leftward. The slow movement action may be identified as a "slow_up" action when the portable device slowly moves upward. The slow movement action may be identified as a "slow_down" action when the portable device slowly moves downward. In the beginning, the processor 204/1204 initializes the accumulated position by an initial position (e.g., 0), and then starts the following procedure of adjusting/updating the accumulated position (step 1602).

When magnitude of a checked motion vector is too large to be smaller than the first predetermined threshold setting, meaning that the user may enter a fast movement action at this moment, the accumulated position is reset to the initial position instantly to restart the procedure of adjusting/updating the accumulated position (steps 1604 and 1606). For example, if each of the maximum X-axis motion vector component and maximum Y-axis motion vector component found between two consecutive images is 10, the first predetermined threshold setting may include a first threshold in the X-axis and a second threshold in Y-axis both set by 5. When the magnitude of a checked motion vector is small enough, the accumulated position is adjusted according to the motion vector (step 1608).

When the user enters the slow movement action, the accumulated position will keep changing slowly. Therefore, the processor 204/1204 may use a second predetermined threshold setting to check occurrence of the slow movement action. For example, the second predetermined threshold setting may include a first threshold and a second threshold for either of X-axis and Y-axis, where the first threshold may be +8, and the second threshold may be −8. When the accumulated position is not larger than the second predetermined threshold setting, the processor 204/1204 may reduce the accumulated position before checking the next motion vector (steps 1612 and 1614), or directly check the next motion vector (step 1612). As the accumulated position is determined by accumulating motion vectors, errors of the motion vectors may also be accumulated to degrade the detection accuracy of the slow movement action. To mitigate the accumulated error, the processor 204/1204 gradually reduces the accumulated position toward the initial position before the accumulated position reaches the second predetermined threshold setting. For example, the processor 204/1204 adds an adjustment step, either +1 or −1, to the accumulated position per 30 images (or ~1 sec). Hence, in step 1612, the processor 204/1204 checks if a predetermined number of consecutive motion vectors (e.g., motion vectors of 30 consecutive images) have been checked and used to adjust the accumulated position since the accumulated position is initialized/reset by the initial position. If the condition is met, step 1614 is executed to gradually reduce the accumulated position toward the initial position by adding the adjustment step (e.g., +1 or −1) to the accumulated position. If the condition is not met, the flow proceeds with step 1604 to keep checking motion vector of the next image.

When the accumulated position is smaller than the second predetermined threshold setting, this implies that the user moves the portable device slowly. Hence, the processor 204/1204 refers to the moving direction of the accumulated position to identify the slow movement action as one of the "slow_left" action, "slow_right" action, "slow_up" action and "slow_down" action (step 1616). Next, the processor 204/1204 instantly resets the accumulated position to the initial position to restart the procedure of adjusting the accumulated position by accumulating motion vectors (step 1618).

As mentioned above, the UI may need time to respond to the detected fast movement action, and the time of actual movement of the portable device and the time of user's slow movement action may not be the same due to user inertia when the portable device is moving. In this embodiment, after one slow movement action is determined, the processor 204/1204 is operative to skip accumulating motion vectors of a predetermined number of following image(s) (step 1620). For example, the processor 204/1204 may skip one image. Besides, when step 1620 is executed, it may avoid detecting continuous actions for the same user input.

Figure 17:
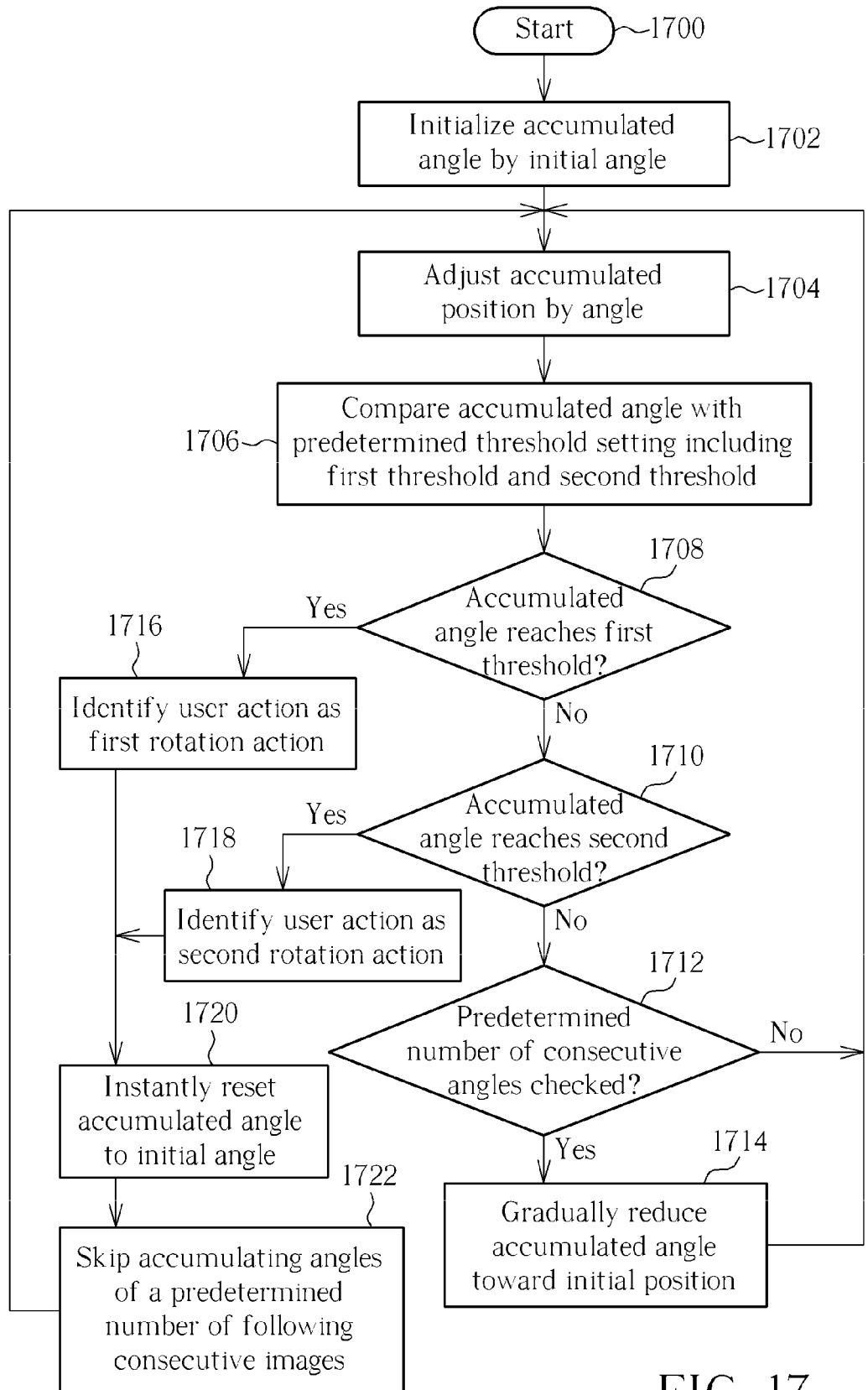
FIG. 17 is a flowchart illustrating a method of detecting a rotation action according to an embodiment of the present invention.

Regarding the detection of the rotation action, the motion sensor output S_OUT may include an angle of each captured image in the image output IMG_OUT, and the angles may be accumulated to determine the rotation action. Specifically, the processor 204/1204 determines an accumulated angle derived from accumulating angles of consecutive captured images, and identifies the rotation action according to the accumulated angle. FIG. 17 is a flowchart illustrating a method of detecting a rotation action according to an embodiment of the present invention. Provided that the result is substantially the same, the steps are not required to be executed in the exact order shown in FIG. 17. The detection of the rotation action may be briefly summarized as below.

Step 1700: Start.

Step 1702: Initialize an accumulated angle by an initial angle.

Step 1704: Adjust the accumulated position by an angle of an image.

Step 1706: Compare the accumulated angle with a predetermined threshold setting, including a first threshold and a second threshold.

Step 1708: Check if the accumulated angle reaches the first threshold. If yes, go to step 1716; otherwise, go to step 1710.

Step 1710: Check if the accumulated angle reaches the second threshold. If yes, go to step 1718; otherwise, go to step 1712.

Step 1712: Check if a predetermined number of consecutive angles have been checked since the accumulated angle is initialized/reset by the initial position. If yes, go to step 1714; otherwise, go to step 1704 to keep processing angle of the next image.

Step 1714: Gradually reduce the accumulated angle toward the initial position. Go to step 1704 to keep processing angle of the next image.

Step 1716: Identify the user action as a first rotation action, such as one of a "rotate_clockwise" action and a "rotate_counterclockwise" action. Go to step 1720.

Step 1718: Identify the user action as a second rotation action, such as the other of the "rotate_clockwise" action and the "rotate_counterclockwise" action.

Step 1720: Instantly reset the accumulated angle to the initial angle.

Step 1722: Skip accumulating angles of a predetermined number of following consecutive images. Next, go to step 1704 to keep processing angle of the next image.

The user may perform the rotation action by rotating the portable device in a clockwise direction or a counterclockwise direction. Therefore, the rotation action may be identified as a "rotate_clockwise" action when the portable device is rotated clockwise, and the rotation action may be identified as a "rotate_counterclockwise" action when the portable device is rotated counterclockwise. In the beginning, the processor 204/1204 initializes the accumulated angle by an initial angle (e.g., 0°), and then starts the following procedure of adjusting/updating the accumulated angle (step 1702 and 1704).

Next, the processor 204/1204 compares the accumulated angle with a predetermined threshold setting (step 1706). As mentioned above, the rotation action may be a clockwise rotation or a counterclockwise rotation. Therefore, the predetermined threshold setting may include a first threshold (e.g., +60° used for identifying the "rotate_clockwise" action and a second threshold (e.g., −60° used for identifying the "rotate_counterclockwise" action. When the accumulated angle does not reach the predetermined threshold setting (i.e., −60°≤accumulated angle≤+60°)°, the processor 204/1204 may reduce the accumulated position before processing the next angle (steps 1712 and 1714), or directly process the next angle (step 1712). As the accumulated angle is determined by accumulating angles of consecutive images, errors of the angles may also be accumulated to degrade the detection accuracy of the rotation action. To mitigate the accumulated error, the processor 204/1204 gradually reduces the accumulated angle toward the initial angle before the accumulated angle reaches the predetermined threshold setting. For example, the processor 204/1204 adds an adjustment step, either +1° or −1°, to the accumulated angle per 15 images (or ~0.5 sec). Hence, in step 1712, the processor 204/1204 checks if a predetermined number of consecutive angles (e.g., angles of 15 consecutive images) have been processed to adjust the accumulated angle since the accumulated angle is initialized/reset by the initial angle. If the condition is met, step 1714 is executed to gradually reduce the accumulated angle toward the initial angle by adding the adjustment step (e.g., +1° or −1)° to the accumulated angle. If the condition is not met, the flow proceeds with step 1704 to keep processing the next angle.

When the accumulated angle reaches the predetermined threshold setting (i.e., accumulated angle≥+60° or accumulated angle≥−60°, this implies that the user rotates the portable device in the clockwise direction or the counterclockwise direction. Hence, the processor 204/1204 refers to the comparison result to identify the rotation action as one of the "rotate_clockwise" action and "rotate_counterclockwise" action (steps 1708, 1710, 1716 and 1718). Next, the processor 204/1204 instantly resets the accumulated angle to the initial angle to restart the procedure of adjusting/updating the accumulated angle (step 1720).

As mentioned above, the UI may need time to respond to the detected fast movement action, and the time of actual movement of the portable device and the time of user's slow movement action may not be the same due to user inertia when the portable device is moving. In this embodiment, after one rotation action is determined, the processor 204/1204 is operative to skip accumulating angles of a predetermined number of following images (step 1722). For example, the processor 204/1204 may skip 15 images. Besides, when step 1722 is executed, it may avoid detecting continuous actions for the same user input.

The absolute location $(X_i, Y_i)$ and the absolute rotation angle $\theta_i$ of $i^{th}$ image may also be obtained along with above-mentioned slow movement action, fast movement action and rotation action. For example, the initial location (e.g., (0,0)) and initial rotation angle (e.g., 0°) of the $1^{st}$ captured image in the image output IMG_OUT are set as the absolute location $(X_1, Y_1)$ and the absolute rotation angle $\theta_1$. The absolute location $(X_i, Y_i)$ is derived from accumulating motion vectors of following images, and the absolute rotation angle $\theta_i$ is derived from accumulating angles of following images.

After a control input is determined according to the user action, an application can respond to the control input correspondingly. By way of example, but not limitation, the application may be a desktop & menu control, a multi-angle view (MAV) control, a photo viewer control, a video viewer control, a camera control, a panorama viewer control, a picture rotation control, or a 3D model rendering control.

When the application is the desktop & menu control, the icon selection function may be controlled by the "slow-up" action, "slow-down" action, "slow-left" action and "slow-right" action; the desktop switch function may be controlled by the "fast_left" action and "fast_right" action; the click function may be controlled by the "fast_up" action and "fast_down" action; and the rotation function may be controlled by "rotate_clockwise" action and "rotate_counterclockwise" action.

When the application is the MAV viewer control, the picture selection function may be controlled by the absolute location; the rotation function may be controlled by the "rotate_clockwise" action and "rotate_counterclockwise" action; and the exit function may be controlled by the "fast_up" action and "fast_down" action.

When the application is the photo viewer control, the 'next picture' function may be controlled by the "fast_right" action; the 'previous picture' function may be controlled by "fast_left" action; the rotation function may be controlled by the "rotate_clockwise" action and "rotate_counterclockwise" action; and the exit function may be controlled by the "fast_down" action.

When the application is the video viewer control, the 'jump to next 10 seconds' function may be controlled by the "fast_right" action; the 'jump to previous 10 seconds' function may be controlled by the "fast_left" action; and pause & play function may be controlled by the "fast_down" action; the rotation function may be controlled by the "rotate_clockwise" action and "rotate_counterclockwise" action; and the exit function may be controlled by the "fast_up" action.

When the application is the camera control, the capture function may be controlled by the "fast_left" action and "fast_right" action; the picture rotation function may be controlled by the "rotate_clockwise" action and "clock_counterclockwise" action; and the exit function may be controlled by the "fast_up" action and "fast_down" action.

When the application is the panorama view control, the region of interest (ROI) viewing function may be controlled by the absolute location; the rotation function may be controlled by "rotate_clockwise" action and "rotate_counterclockwise" action; and the exit function may be controlled by "fast_up" action and "fast_down" action.

When the application is the picture rotation control, the rotation angle may be controlled by the absolution angle; the rotation function may be controlled by the "rotate_clockwise" action and "rotate_counterclockwise" action; and the exit function may be controlled by the "fast_up" action and "fast_down" action.

When the application is the 3D model rendering control, the 3D model rotation angle may be controlled by the absolute location and absolute angle; and the exit function may be controlled by two consecutive "fast_up" actions, two consecutive "fast_down" actions, two consecutive "fast_left" actions, or two consecutive "fast_right" actions.

In one exemplary design, the application may be performed by a portable device (e.g., a mobile phone in which the image-based motion sensor 100 is disposed). In another exemplary design, the image-based motion sensor 100 is disposed in a first electronic device (e.g., a mobile phone), and the application is performed by a second electronic device (e.g., a television) external to the first electronic device. Therefore, the processor 204/1204 of the processing system 104 generates a control signal to the second electronic device according to the identified user action via any wire/wireless communication means. Therefore, the first electronic device with the image-based motion sensor 100 may act as a remote control of the second electronic device.

Figure 18:
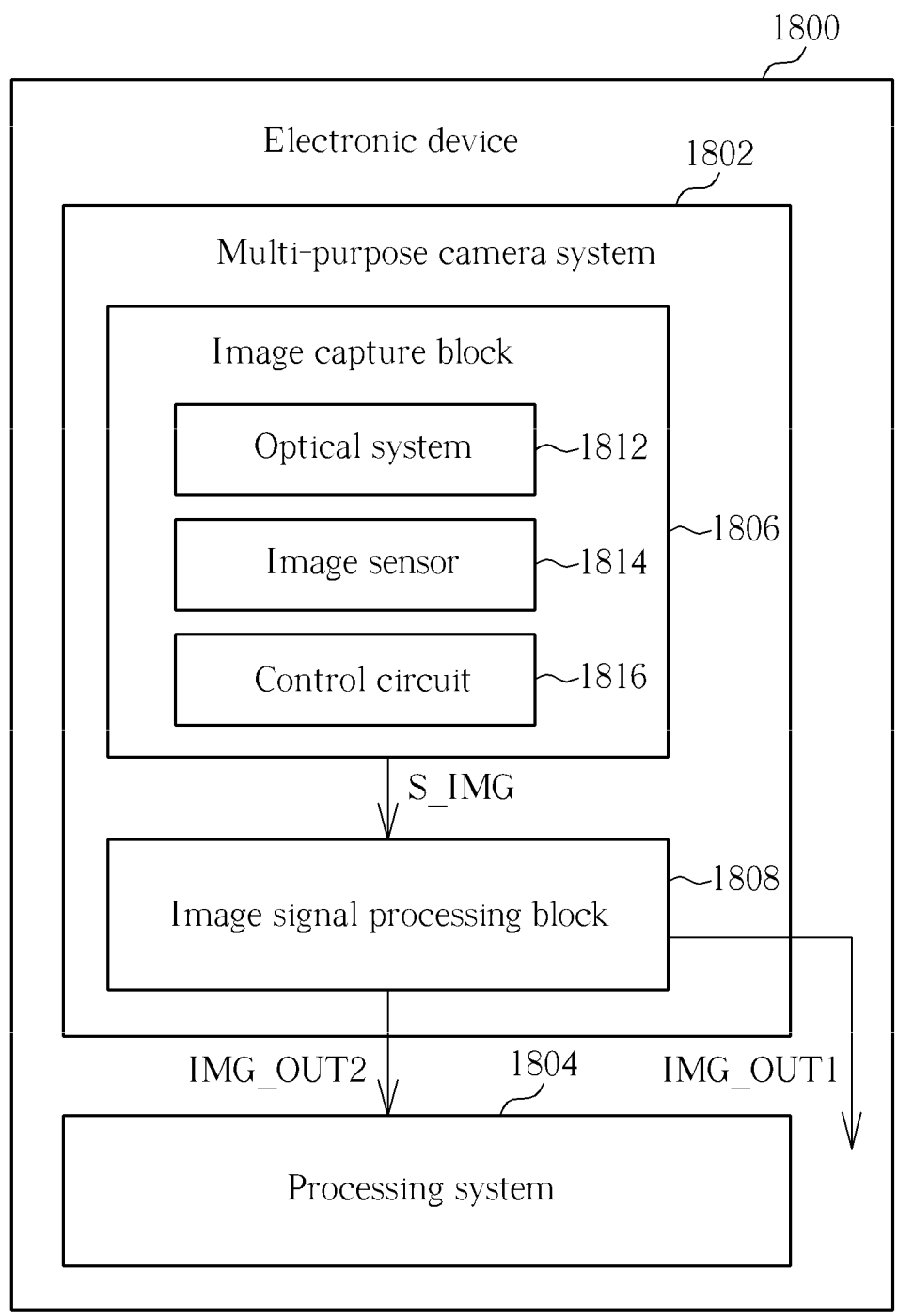
FIG. 18 is a block diagram illustrating an electronic device according to an exemplary embodiment of the present invention.

In one exemplary implementation, the camera system 102 shown in FIG. 1 may be a dedicated component for the image-based motion sensor 100. However, this is not meant to be a limitation of the present invention. In another exemplary implementation, the camera system 102 may be a multi-purpose camera system that supports multiple operation modes. For example, when the multi-purpose camera system is operated in a first operation mode, the multi-purpose camera system acts as a normal camera, and when the multi-purpose camera system is operated in a second operation mode, the multi-purpose camera system acts as part of the image-based motion sensor. Please refer to FIG. 18, which is a block diagram illustrating an electronic device according to an exemplary embodiment of the present invention. The electronic device 1800 may a portable electronic device, such as a mobile phone with the proposed multi-purpose camera system integrated therein. As shown in FIG. 18, the electronic device 1800 includes, but is not limited to, a multi-purpose camera system 1802 and a processing system 1804. The multi-purpose camera system 1802 has an image capture block 1806 and an image signal processing block 1808, where the image capture block 1806 has an optical system 1812, an image sensor 1814, and a control circuit 1816. The image capture block 1806 is arranged for generating an image signal S_IMG, and the image signal processing block 1808 is arranged for processing the image signal S_IMG to generate an image output IMG_OUT1/IMG_OUT2. When the multi-purpose camera system 1802 is operated in a first operation mode (e.g., a normal camera mode), the multi-purpose camera system 1802 acts as a camera for generating a captured image output IMG_OUT1. However, when the multi-purpose camera system 1802 is operated in a second operation mode (e.g., a special camera mode such as a motion sensor mode), the multi-purpose camera system 1802 acts as part of a motion sensor (e.g., the aforementioned image-based motion sensor 100) for generating an image output IMG_OUT2. Besides, the processing system 1804 (e.g., the aforementioned processing system 104) acts as another part of the motion sensor, and is arranged for identifying the user action (e.g., a fast movement action, a slow movement action or a rotation action) by processing the image output IMG_OUT2 of the image signal processing block 1808 in the second operation mode. It should be noted that an overall configuration of the control circuit 1816 and the image signal processing block 1808 in the first operation mode is different from an overall configuration of the control circuit 1816 and the image signal processing block 1808 in the second operation mode.

Figure 19:
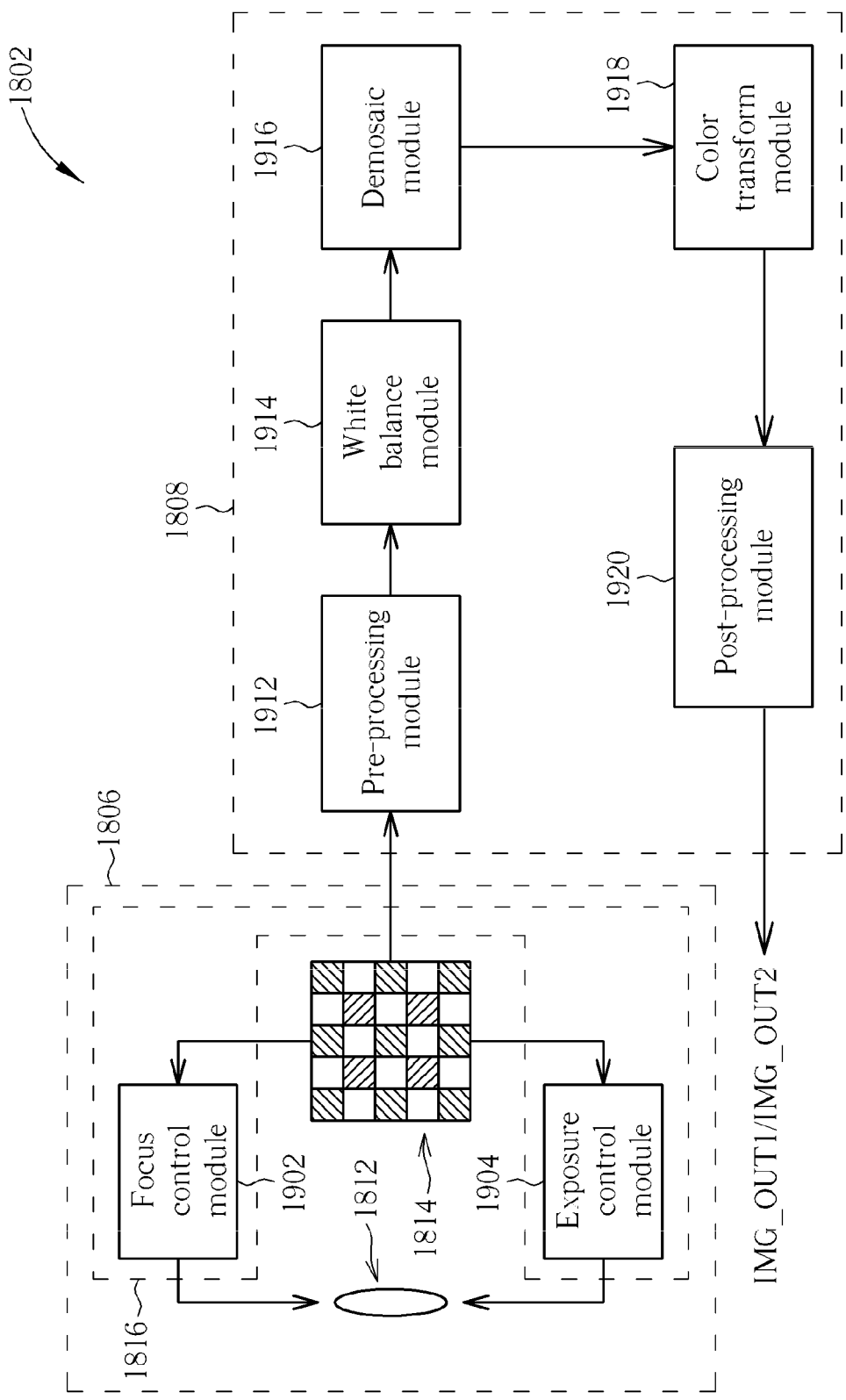
FIG. 19 is a diagram illustrating an exemplary implementation of the multi-purpose camera system shown in FIG. 18.

Please refer to FIG. 19, which is a diagram illustrating an exemplary implementation of the multi-purpose camera system 1802 shown in FIG. 18. As shown in FIG. 19, the control circuit 1816 in the image capture block 1806 may include a focus control module 1902 and an exposure control module 1904. The optical system 1812 may include a lens module whose focus setting and exposure setting (e.g., aperture size and/or shutter speed) are controlled by the focus control module 1902 and the exposure control module 1904, respectively. Regarding the image signal processing block 1808, it includes a plurality of signal processing modules, such as a pre-processing module 1912, a white balance module 1914, a demosaic module 1916, a color transform module 1918, and a post-processing module 1920. The pre-processing module 1912 may perform dark current compensation, linearization, flare compensation, etc. The white balance module 1914 may perform automatic/manual compensation for white balance by applying different weighting factors to the red (R), green (G) and blue (B) components of an image. The demosaic module 1916 may make use of pixel neighborhood information to estimate values of pixel colors that are not measured/sensed by the image sensor 1814. The color transform module 1918 may perform a color transform from one color space to another color space. For example, the color transform module 1918 may perform an RGB-to-YUV color transform upon a color image to thereby derive a grayscale image composed of luminance values/gray levels of pixels. The post-processing module 1920 may perform color-artifact removal, edge enhancement, coring, etc.

By way of example, but not limitation, changing the overall configuration of the control circuit 1816 and the image signal processing block 1808 may be realized by disabling at least one signal processing module/control module and/or controlling at least one signal processing module/control module to employ a different algorithm (e.g., a simplified algorithm or a low-power algorithm). Several examples with reference to the exemplary multi-purpose camera system 1802 shown in FIG. 19 are disclosed hereinafter.

In a first exemplary design, at least one signal processing module included in the image signal processing block 1808 is enabled (or powered on) in the first operation mode, and is disabled (or powered off) in the second operation mode. As the multi-purpose camera system 1802 operated in the second operation mode to perform a motion sensor function does not need to produce a precise image of a captured scene, one or more of the signal processing modules included in the image signal processing block 1808 may be shut down without affecting the desired motion sensor function. For example, the pre-processing module 1912, the white balance module 1914 and/or the post-processing module 1920 may be disabled when the multi-purpose camera system 1802 is operated in the second operation mode, such that the input of the disabled signal processing module is bypassed without being processed by the disabled signal processing module. Additionally, due to shutting down one or more signal processing modules in the second operation mode, power consumption of the image signal processing block 1808 in the second operation mode is lower than power consumption of the image signal processing block 1808 in the first operation mode. In a case where the electronic device 1800 is a portable electronic device powered by a battery device, the electronic device 1800 may benefit from such a low power consumption feature of the multi-purpose camera system 1802 when the multi-purpose camera system 1802 is configured to act as part of a motion sensor which is required to continuously capture consecutive images for detecting movement/rotation of the electronic device.

In a second exemplary design, at least one signal processing module included in the image signal processing block 1808 employs a first algorithm in the first operation mode, and employs a second algorithm different from the first algorithm in the second operation mode. As the multi-purpose camera system 1802 operated in the second operation mode to perform a motion sensor function does not need to produce a precise image of a captured scene, one or more of the signal processing modules included in the image signal processing block 1808 may employ the second algorithm (e.g., a simplified algorithm or a low-power algorithm) without affecting the desired motion sensor function. Hence, images which can be used to successfully detect the movement/rotation of the electronic device 1800 may be obtained by configuring the demosaic module 1916 to use a simplest algorithm among all available demosaicing algorithms, and/or configuring the color transform module 1918 to perform an RGB-to-YUV color transform upon a color image to generate a grayscale image and only store luminance (Y) values derived from the RGB-to-YUV color transform.

After a luminance image (i.e., grayscale image) is obtained by the color transform module 1918, the following post-processing module 1920 may derive a binary image from the grayscale image by comparing a luminance value of each pixel in the grayscale image with a threshold value, assigning a first predetermined luminance value (e.g., 255) to the pixel when the luminance value is greater than the threshold value, and assigning a second predetermined luminance value (e.g., 0) to the pixel when the luminance value is not greater than the threshold value. Thus, as the computational complexity is reduced due to image binarization, the motion sensor function can be easily realized through analyzing consecutive binary images by using the simplified algorithm/low-power algorithm. Compared to using luminance images for motion estimation, using binary images for motion estimation may produce a less accurate motion estimation result. However, since the computing power is an important issue for a low-cost application, the computational complexity reduction of the image-based motion sensor employed by the low-cost application may be achieved by using binary images for motion estimation. This also falls within the scope of the present invention.

Alternatively, after a luminance image (i.e., grayscale image) is obtained by the color transform module 1918, the following post-processing module 1920 may down-sample the grayscale image with an original image resolution (e.g., 720×480) to generate a down-sampled grayscale image with a reduced image resolution (e.g., 45×30), and then derive a binary image from the down-sampled grayscale image by comparing a luminance value of each pixel in the down-sampled grayscale image with a threshold value, assigning a first predetermined luminance value (e.g., 255) to the pixel when the luminance value is greater than the threshold value, and assigning a second predetermined luminance value (e.g., 0) to the pixel when the luminance value is not greater than the threshold value. Thus, as the computational complexity may be significantly reduced by image binarization and down-sampling, the motion sensor function can be easily realized through analyzing consecutive down-sampled binary images by using simplified algorithm/low-power algorithm.

Additionally, due to using simplified algorithm/low-power algorithm in the second operation mode, power consumption of the image signal processing block 1808 in the second operation mode is lower than power consumption of the image signal processing block 1808 in the first operation mode. In a case where the electronic device 1800 is a portable electronic device powered by a battery device, the electronic device 1800 may benefit from such a low power consumption feature of the multi-purpose camera system 1802 when the multi-purpose camera system 1802 is configured to act as part of a motion sensor which is required to continuously capture consecutive images for detecting movement/rotation of the electronic device 1800.

In a third exemplary design, at least one control module included in the control circuit 1816 employs a first algorithm in the first operation mode, and employs a second algorithm different from the first algorithm in the second operation mode. As the multi-purpose camera system 1802 operated in the second operation mode to perform a motion sensor function does not need to produce a precise image of a captured scene, one or more of the control modules included in the control circuit 1816 may employ the second algorithm (e.g., a simplified algorithm or a low-power algorithm) without affecting the desired motion sensor function. Hence, images which can be used to successfully detect the movement/rotation of the electronic device 1800 may be obtained by setting the exposure control module 1904 to use a pre-defined and fixed exposure parameter setting instead of a normal auto-exposure function, and/or setting the focus control module 1902 to use a pre-defined and fixed focus parameter setting instead of a normal auto-focus function. Additionally, due to using simplified algorithm/low-power algorithm in the second operation mode, power consumption of the control circuit 1816 in the second operation mode is lower than power consumption of the control circuit 1816 in the first operation mode. In a case where the electronic device 1800 is a portable electronic device powered by a battery device, the electronic device 1800 may benefit from such a low power consumption feature of the multi-purpose camera system 1802 when the multi-purpose camera system 1802 is configured to act as part of a motion sensor which is required to continuously capture consecutive images for detecting movement/rotation of the electronic device 1800.

In a fourth exemplary design, the image capture block 1806 is configured to operate in a first capture frame rate in the first operation mode, and is configured to operate in a second capture frame rate higher than the first capture frame rate in the second operation mode. For example, the first capture frame rate is set by a normal frame rate of a camera, and the second capture frame rate is set by a highest frame rate supported by the multi-purpose camera system 1802. With an increased capture frame rate employed by the multi-purpose camera system 1802 in the second operation mode, the sensitivity of the motion sensor function is improved accordingly.

In a fifth exemplary design, the image capture block 1806 is configured to operate in a first capture resolution in the first operation mode, and is configured to operate in a second capture resolution lower than the first capture resolution in the second operation mode. As the multi-purpose camera system 1802 operated in the second operation mode to perform a motion sensor function does not need to produce a precise image of a captured scene, the capture resolution may be reduced in the second operation mode to reduce the computational complexity as well as power consumption. Similarly, in a case where the electronic device 1800 is a portable electronic device powered by a battery device, the electronic device 1800 may benefit from such a low power consumption feature of the multi-purpose camera system 1802 when the multi-purpose camera system 1802 is configured to act as part of a motion sensor which is required to continuously capture consecutive images for detecting movement/rotation of the electronic device 1800.

Figure 20:
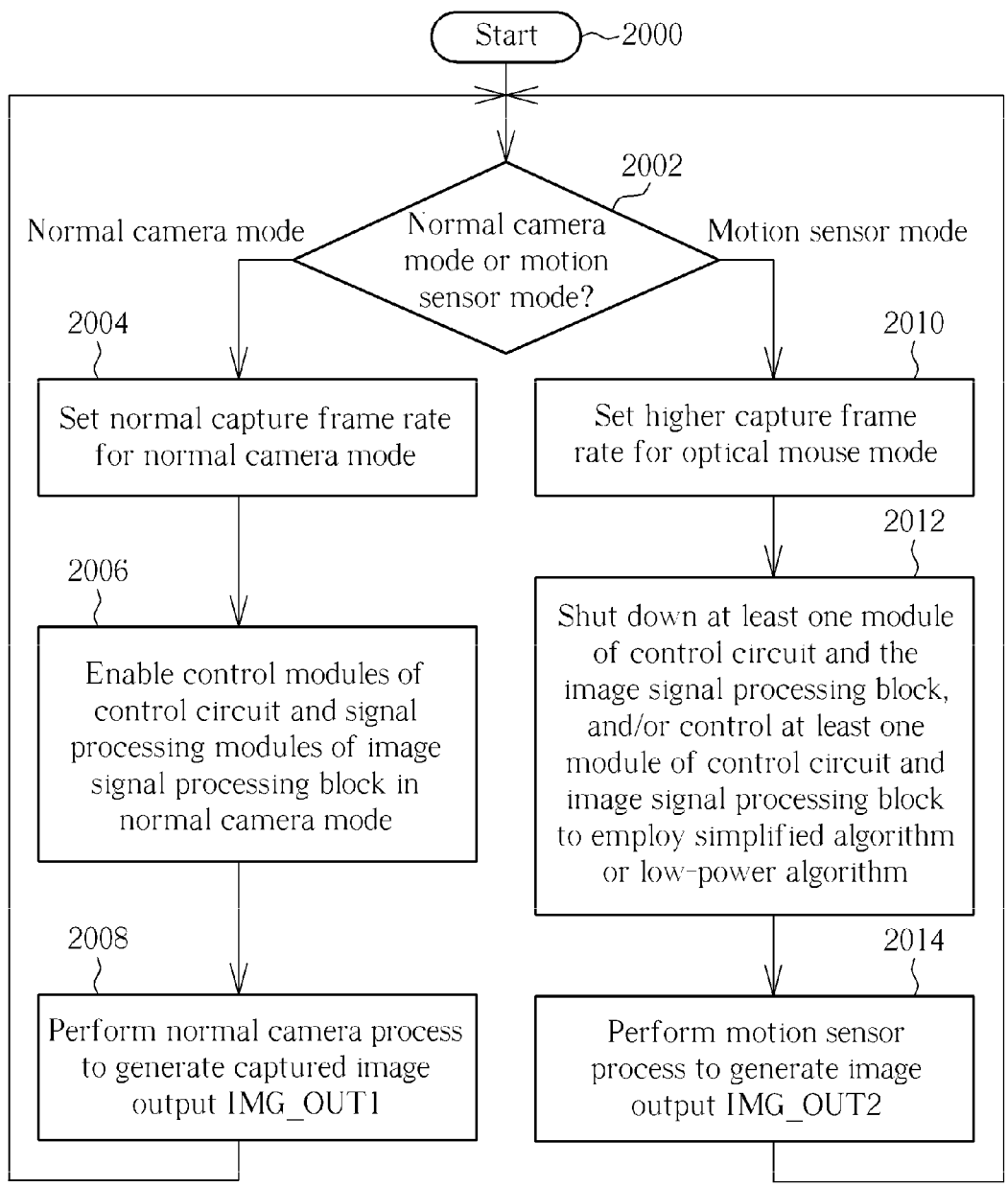
FIG. 20 is a flowchart illustrating a mode switching operation of the multi-purpose camera system according to an exemplary embodiment.

As mentioned above, the multi-purpose camera system 1802 supports different operation modes, including the first operation mode (e.g., the normal camera mode) and the second operation mode (e.g., the motion sensor mode). The multi-purpose camera system 1802 may switch between different operation modes in response to a mode control signal triggered by the user or application software. FIG. 20 is a flowchart illustrating a mode switching operation of the multi-purpose camera system 1802 according to an exemplary embodiment. Provided that the result is substantially the same, the steps are not required to be executed in the exact order shown in FIG. 20. The exemplary mode switching operation may be briefly summarized as follows.

Step 2000: Start.

Step 2002: Check which operation mode that the multi-purpose camera system 1802 should enter. If the multi-purpose camera system 1802 is required to enter the first operation mode (e.g., normal camera mode), the flow proceeds with step 2004. If the multi-purpose camera system 1802 is required to enter the second operation mode (e.g., motion sensor mode), the flow proceeds with step 2010.

Step 2004: Set the normal capture frame rate for the normal camera mode.

Step 2006: Enable control modules of the control circuit 1816 and signal processing modules of the image signal processing block 1808 in the normal camera mode.

Step 2008: Perform the normal camera process to generate the captured image output IMG_OUT1. Next, the flow proceeds with step 2002 to check if the current operation mode should be changed.

Step 2010: Set the higher capture frame rate for the motion sensor mode.

Step 2012: Shut down at least one module of the control circuit 1816 and the image signal processing block 1808, and/or control at least one module of the control circuit 1816 and the image signal processing block 1808 to employ a simplified algorithm/low-power algorithm.

Step 2014: Perform the motion sensor process to generate the image output IMG_OUT2. Next, the flow proceeds with step 2002 to check if the current operation mode should be changed.

As a person skilled in the art can readily understand details of each step in FIG. 20 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image-based motion sensor, comprising:
a camera system, arranged for generating an image output including a plurality of captured images; and
a processing system, arranged for obtaining a motion sensor output by processing the image output, and identifying a user input as one of a plurality of pre-defined user actions according to the motion sensor output, wherein different functions of at least one application performed by one electronic device are controlled by the pre-defined user actions; and the motion sensor output includes information indicative of at least one of a motion status and an orientation status of the image-based motion sensor;
wherein the camera system performs an RGB-to-YUV color transform upon one color image to generate one grayscale image, and only luminance values derived from the RGB-to-YUV color transform are involved in obtaining the motion sensor result.

2. The image-based motion sensor of claim 1, wherein the motion sensor output includes information indicative of the orientation status of the image-based motion sensor, and the information indicative of the orientation status includes roll, pitch, and yaw related motion information.

3. The image-based motion sensor of claim 1, wherein the motion sensor output includes information indicative of the motion status of the image-based motion sensor, and the information indicative of the motion status includes speed, acceleration and displacement information.

4. The image-based motion sensor of claim 1, wherein the processing system comprises:
a global motion estimation block, arranged for generating global motion information according to the image output; and
a processor, arranged for determining the motion sensor output according to the global motion information.

5. The image-based motion sensor of claim 4, wherein the global motion estimation block includes an electronic image stabilization (EIS) module arranged to perform global motion estimation.

6. The image-based motion sensor of claim 4, wherein the global motion estimation block comprises:
a motion estimation unit, arranged for performing motion estimation upon each of a plurality of pairs of co-located sub-images in a first captured image and a second captured image, and generating a plurality of motion vectors of the pairs of co-located sub-images, wherein the first captured image and the second captured image are consecutive captured images; and
a motion vector analysis unit, arranged for generating the global motion information by analyzing the motion vectors.

7. The image-based motion sensor of claim 4, wherein the global motion estimation block comprises:
an image down-scaling unit, arranged for down-scaling a first captured image and a second captured image to generate a first down-scaled image and a second down-scaled image, respectively, wherein the first captured image and the second captured image are consecutive captured images; and
a global motion estimation unit, arranged for generating the global motion information by performing global motion estimation upon the first down-scaled image and the second down-scaled image.

8. The image-based motion sensor of claim 4, wherein the global motion estimation block comprises:
an image down-scaling unit, arranged for generating a first down-scaled image of a first captured image and a second down-scaled image of a second captured image, wherein the first captured image and the second captured image are consecutive captured images;
a transform unit, arranged for performing a specific transform upon the first down-scaled image and the second down-scaled image to generate a first transformed image and a second transformed image, respectively; and
a global motion estimation unit, arranged for generating the global motion information by performing global motion estimation according to the first transformed image and the second transformed image.

9. The image-based motion sensor of claim 8, wherein the specific transform is a linear polar transform or a Log-polar transform.

10. The image-based motion sensor of claim 9, wherein the global motion estimation unit is further arranged for generating another global motion information by performing global motion estimation upon a third down-scaled image and a fourth down-scaled image; and the image down-scaling unit comprises:
an image down-scaling circuit, arranged for down-scaling the first captured image and the second captured image to generate the third down-scaled image and the fourth down-scaled image, respectively; and
an image alignment circuit, arranged for generating the first down-scaled image and the second down-scaled image by referring to the another global motion information to perform image alignment upon the third down-scaled image and the fourth down-scaled image.

11. The image-based motion sensor of claim 8, wherein the global motion estimation unit performs the global motion estimation in one direction only.

12. The image-based motion sensor of claim 1, wherein the processing system comprises:
an edge detection block, arranged for generating global motion information by performing edge detection according to the image output; and
a processor, arranged for determining the motion sensor output according to the global motion information.

13. The image-based motion sensor of claim 12, wherein the edge detection block comprises:
an image down-scaling unit, arranged for down-scaling a first captured image and a second captured image to generate a first down-scaled image and a second down-scaled image, respectively, wherein the first captured image and the second captured image are consecutive captured images;
an edge detection unit, arranged for performing edge detection upon the first down-scaled image to generate first edge information, and performing edge detection upon the second down-scaled image to generate second edge information; and an edge histogram unit, arranged for deriving a first edge histogram from the first edge information; and deriving a second edge histogram from the second edge information; and an edge histogram matching unit, arranged for generating the global motion information by performing edge histogram matching upon the first edge histogram and the second edge histogram.

14. The image-based motion sensor of claim 13, wherein the edge histogram unit is further arranged for performing a filtering operation upon the first edge histogram and the second edge histogram before transmitting the first edge histogram and the second edge histogram to the edge histogram matching unit.

15. The image-based motion sensor of claim 1, wherein the image-based motion sensor is disposed in a first electronic device external to a second electronic device, the processing system is further arranged to generate a control signal to the second electronic device according to the motion sensor output.

16. A multi-purpose camera system, comprising:
an image capture block, arranged for generating an image signal; and
an image signal processing block, arranged for processing the image signal; wherein when the multi-purpose camera system is operated in a first operation mode, the multi-purpose camera system acts as a camera for generating a captured image output; and when the multi-purpose camera system is operated in a second operation mode, the multi-purpose camera system acts as part of a motion sensor for generating a motion sensor output, wherein the motion sensor output includes information indicative of at least one of a motion status and an orientation status of the multi-purpose camera system, and is transmitted to a processing system arranged to identify a user input as one of a plurality of pre-defined user actions according to the motion sensor output; different functions of at least one application performed by one electronic device are controlled by the pre-defined user actions;
wherein the image signal processing block performs an RGB-to-YUV color transform upon one color image to generate one grayscale image in the second operation mode, and only luminance values derived from the RGB-to-YUV color transform are involved in generating the motion sensor output.

17. The multi-purpose camera system of claim 16, wherein the image capture block comprises an image sensor, an optical system, and a control circuit, and an overall configuration of the control circuit and the image signal processing block in the first operation mode is different from an overall configuration of the control circuit and the image signal processing block in the second operation mode.

18. The multi-purpose camera system of claim 17, wherein power consumption of the image signal processing block in the second operation mode is lower than power consumption of the image signal processing block in the first operation mode.

19. The multi-purpose camera system of claim 17, wherein one signal processing module included in the image signal processing block is enabled in the first operation mode, and is disabled in the second operation mode.

20. The multi-purpose camera system of claim 17, wherein one signal processing module included in the image signal processing block employs a first algorithm in the first operation mode, and employs a second algorithm different from the first algorithm in the second operation mode.

21. The multi-purpose camera system of claim 17, wherein power consumption of the control circuit in the second operation mode is lower than power consumption of the control circuit in the first operation mode.

22. The multi-purpose camera system of claim 17, wherein one control module included in the control circuit employs a first algorithm in the first operation mode, and employs a second algorithm different from the first algorithm in the second operation mode.

23. The multi-purpose camera system of claim 16, wherein when the multi-purpose camera system acts as part of the motion sensor, the image capture block employs a pre-defined and fixed focus parameter setting.

24. The multi-purpose camera system of claim 16, wherein when the multi-purpose camera system acts as part of the user input apparatus, the image capture block employs a pre-defined and fixed exposure parameter setting.

25. The multi-purpose camera system of claim 16, wherein a white balance module included in the image signal processing block is enabled in the first operation mode, and is disabled in the second operation mode.

26. The multi-purpose camera system of claim 16, wherein the image capture block operates at a first capture rate in the first operation mode, and operates at a second capture rate higher than the first capture rate in the second operation mode.

27. The multi-purpose camera system of claim 16, wherein the image capture block operates at a first capture resolution in the first operation mode, and operates at a second capture resolution lower than the first capture resolution in the second operation mode.

28. An electronic device, comprising:
a multi-purpose camera system, comprising:
an image capture block, arranged for generating an image signal; and
an image signal processing block, arranged for processing the image signal, wherein when the multi-purpose camera system is operated in a first operation mode, the multi-purpose camera system acts as a camera for generating a captured image output, and when the multi-purpose camera system is operated in a second operation mode, the multi-purpose camera system acts as part of a motion sensor; and
a processing system, acting as another part of the motion sensor and arranged for generating a motion sensor output by processing the image output, and identifying a user input as one of a plurality of pre-defined user actions according to the motion sensor output, wherein the motion sensor output includes information indicative of at least one of a motion status and an orientation status of the electronic device; different functions of at least one application performed by one electronic device are controlled by the pre-defined user actions;
wherein the image signal processing block performs an RGB-to-YUV color transform upon one color image to generate one grayscale image in the second operation mode, and only luminance values derived from the RGB-to-YUV color transform are involved in generating the motion sensor output.

29. The electronic device of claim 28, being a portable electronic device.

* * * * *